US010667534B2

(12) United States Patent
Van Schaik et al.

(10) Patent No.: US 10,667,534 B2
(45) Date of Patent: *Jun. 2, 2020

(54) APPARATUS AND METHOD FOR COOKING AN EGG

(71) Applicant: EGGCITING PRODUCTS B.V., Oirlo (NL)

(72) Inventors: Sander-Willem Van Schaik, Utrecht (NL); Edwin Matheus Jozef Hanssen, Lanaken (BE)

(73) Assignee: EGGCITING PRODUCTS B.V., Oirlo (NL)

( * ) Notice: Subject to any disclaimer, the term of this patent is extended or adjusted under 35 U.S.C. 154(b) by 351 days.

This patent is subject to a terminal disclaimer.

(21) Appl. No.: 15/306,078

(22) PCT Filed: Apr. 14, 2015

(86) PCT No.: PCT/EP2015/058059
§ 371 (c)(1),
(2) Date: Oct. 21, 2016

(87) PCT Pub. No.: WO2015/162034
PCT Pub. Date: Oct. 29, 2015

(65) Prior Publication Data
US 2017/0042360 A1 Feb. 16, 2017

(30) Foreign Application Priority Data

Apr. 24, 2014 (NL) .................................. 2012689
Jan. 13, 2015 (NL) .................................. 2014115

(51) Int. Cl.
*A23B 5/01* (2006.01)
*A23B 5/005* (2006.01)
(Continued)

(52) U.S. Cl.
CPC .............. *A23B 5/0052* (2013.01); *A23B 5/01* (2013.01); *A23L 5/10* (2016.08); *A23L 5/13* (2016.08);
(Continued)

(58) Field of Classification Search
CPC ..... A23L 5/10; A23L 5/15; A23L 5/13; A23L 5/17; A23L 15/00; H05B 6/6473;
(Continued)

(56) References Cited

U.S. PATENT DOCUMENTS 2,425,199 A * 8/1947 Navon .................... A47J 29/02
99/440
3,794,801 A * 2/1974 Long ........................ B60K 3/00
180/304
(Continued)

FOREIGN PATENT DOCUMENTS

DE 19738380 A1 3/1999
EP 0988795 A1 3/2000
(Continued)

OTHER PUBLICATIONS

PCT International Preliminary Report on Patentability Chapter I from PCT/EP2015/058059 dated Oct. 25, 2016.
(Continued)

*Primary Examiner* — Drew E Becker
(74) *Attorney, Agent, or Firm* — Ladas & Parry, LLP

(57) ABSTRACT

An apparatus for cooking at least one egg with an eggshell, comprises a housing provided with a device for providing microwave radiation in a confined space in the housing and a holder located in the confined space. The holder is provided with at least one cavity adapted to the shape of the egg with the eggshell. The holder comprises at least a first holder part and a second holder part being movable with respect to each other between a first position in which an egg with an
(Continued)

eggshell can be positioned in the cavity to a second position wherein the holder parts enclose the cavity. The apparatus further comprises means to insert a liquid into the holder for filling the cavity with the liquid to at least partly surround the eggshell of the egg located in the cavity. The apparatus comprises a container for holding the liquid and a dosing unit to add at least one component to the liquid.

20 Claims, 31 Drawing Sheets

(51) Int. Cl.

| | | |
|---|---|---|
| H05B 6/80 | (2006.01) | |
| A23L 5/10 | (2016.01) | |
| A23L 15/00 | (2016.01) | |
| A47J 29/06 | (2006.01) | |
| H05B 6/70 | (2006.01) | |
| A47J 29/02 | (2006.01) | |
| H05B 6/64 | (2006.01) | |

(52) U.S. Cl.
CPC ............... *A23L 5/15* (2016.08); *A23L 5/17* (2016.08); *A23L 15/00* (2016.08); *A47J 29/02* (2013.01); *A47J 29/06* (2013.01); *H05B 6/6473* (2013.01); *H05B 6/70* (2013.01); *H05B 6/80* (2013.01); *H05B 6/804* (2013.01); *A23V 2002/00* (2013.01); *A23V 2300/12* (2013.01); *A23V 2300/24* (2013.01)

(58) Field of Classification Search
CPC ... H05B 6/804; H05B 6/80; H05B 6/70; A47J 29/02; A47J 29/06; A47J 31/404; A23V 2002/00; A23V 2300/12; A23V 2300/24; A23B 5/00–5/0052; A23B 5/01
USPC ............... 426/231–233, 519, 520–521, 523, 426/298–300, 506–511
See application file for complete search history.

(56) References Cited

U.S. PATENT DOCUMENTS

| | | | | |
|---|---|---|---|---|
| 3,910,174 | A * | 10/1975 | Nelles ............... | A01J 25/167 99/452 |
| 4,458,829 | A * | 7/1984 | Greenfield, Jr. ...... | A47J 31/401 198/670 |
| 4,665,808 | A | 5/1987 | Pulvermuller | |
| 5,179,259 | A * | 1/1993 | Martin ............... | H05B 6/804 165/184 |
| 5,655,692 | A * | 8/1997 | Navin ............... | B65G 65/463 222/413 |
| 8,863,985 | B2 * | 10/2014 | Berge ............... | F25C 5/20 222/14 |
| 9,108,788 | B2 * | 8/2015 | Nelissen ............... | A47J 29/02 |
| 10,149,567 | B2 * | 12/2018 | Nelissen ............... | A23L 15/00 |
| 2004/0011807 | A1 * | 1/2004 | Knepler ............... | B67D 1/0871 222/67 |
| 2006/0071037 | A1 * | 4/2006 | Pickrell ............... | B65G 33/32 222/413 |
| 2008/0145491 | A1 | 6/2008 | Braeken | |
| 2009/0008409 | A1 * | 1/2009 | Verhoeven ............ | A47J 31/404 222/64 |
| 2010/0199850 | A1 * | 8/2010 | Koopman ............ | A47J 31/404 99/289 R |
| 2011/0253707 | A1 * | 10/2011 | Li ............... | B01J 19/126 219/690 |
| 2012/0067920 | A1 * | 3/2012 | Veltrop ............... | B67D 3/0019 222/1 |
| 2012/0248143 | A1 * | 10/2012 | Gigandet ............ | A47J 31/404 222/71 |
| 2014/0166697 | A1 * | 6/2014 | Rey ............... | A47J 31/404 222/135 |
| 2017/0042203 | A1 * | 2/2017 | Nelissen ............... | A47J 29/02 |

FOREIGN PATENT DOCUMENTS

| | | |
|---|---|---|
| EP | 0992197 A1 | 4/2000 |
| GB | 2502091 A | 11/2013 |
| WO | 03/093560 A1 | 11/2003 |
| WO | 2008/143505 A1 | 11/2008 |
| WO | 2011/108922 A1 | 9/2011 |
| WO | 2012/002814 A1 | 1/2012 |

OTHER PUBLICATIONS

Office Action from Taiwanese Patent Application No. 104112401 dated Jul. 26, 2018 with Search Report and its English translation.
International Search Report for PCT/EP2015/058059 dated Sep. 10, 2015.
Written Opinion of the International Search Authority PCT/EP2015/058059 dated Sep. 10, 2015.

* cited by examiner

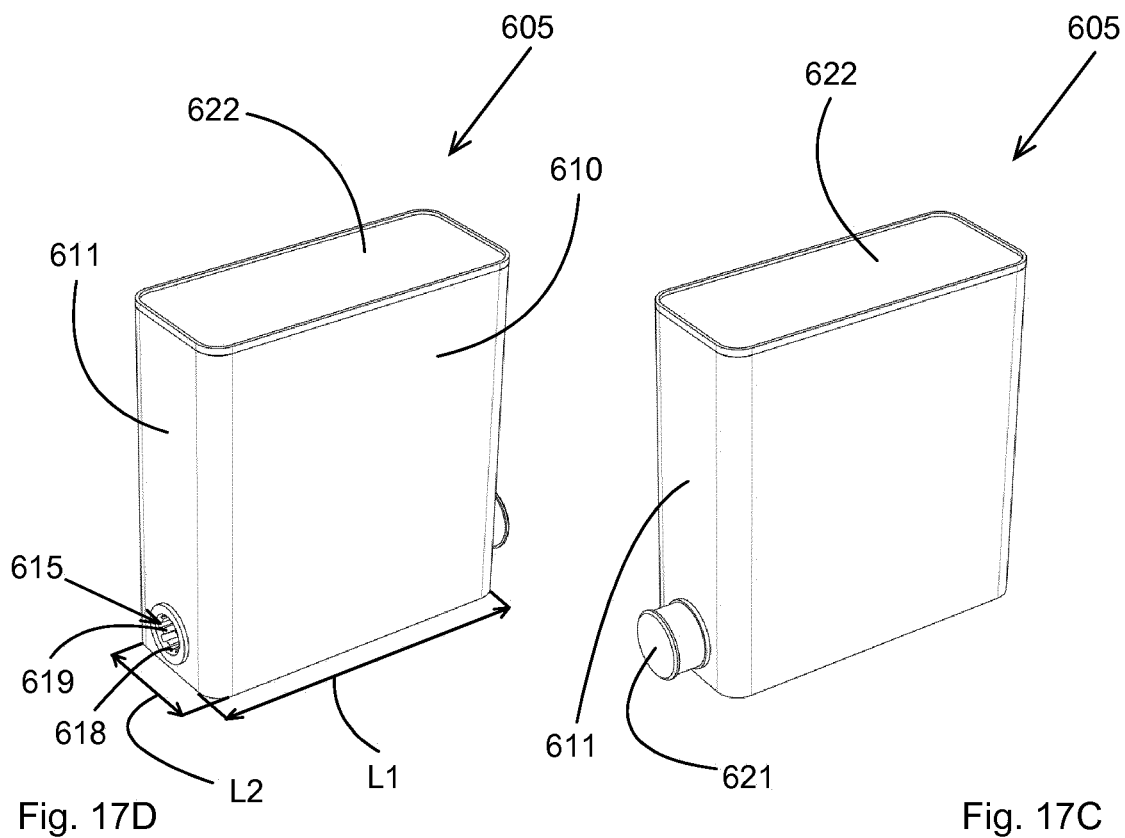

APPARATUS AND METHOD FOR COOKING AN EGG

An apparatus for cooking at least one egg with an eggshell, a dosing unit suitable for such an apparatus, a container suitable for such a dosing unit and a method for cooking at least one egg with an eggshell in such an apparatus.

CROSS-REFERENCE TO RELATED APPLICATIONS

This application is the U.S. national phase of PCT Application PCT/EP2015/058059 filed on Apr. 14, 2015, which claims the priorities of the Dutch patent application No. 2012689 filed on Apr. 24, 2014 and U.S. Pat. No. 2,014,115 filed on Jan. 13, 2015, which are incorporated herein by reference in their entireties.

FIELD OF THE INVENTION

The invention relates to an apparatus for cooking at least one egg with an eggshell, which apparatus comprises a housing provided with a device for providing microwave radiation in a confined space in the housing and a holder located in the confined space, which holder being provided with at least one cavity adapted to the shape of the egg with the eggshell, which holder comprises at least a first holder part and a second holder part being movable with respect to each other between a first position in which an egg with an eggshell can be positioned in the cavity to a second position wherein the holder parts enclose the cavity, which apparatus further comprises means to insert a liquid into the holder for filling the cavity with the liquid to at least partly surround the eggshell of the egg located in the cavity.

The invention also relates to a dosing unit suitable for such an apparatus, a container suitable for such a dosing unit and a method for cooking at least one egg with an eggshell in such an apparatus.

BACKGROUND OF THE INVENTION

By such an apparatus which is known from WO2012002814A1, an egg is placed in a cavity of the holder. Next, water is allowed to access the holder. The holder is provided with salt in a matrix in order to be mixed into the water.

A disadvantage of this known apparatus is that for each egg a new matrix needs to be placed in the cavity.

SUMMARY OF THE INVENTION

One of the objects of the apparatus according to the invention is to easily provide the liquid with a desired component.

This object is achieved by the apparatus according to the invention in that the apparatus comprises a container for holding the liquid and a dosing unit to add at least one component to the liquid.

By means of the dosing unit at least one component, for example salt preferably NaCl can be added to the liquid, for example water, to obtain the desired aqueous liquid. The user can fill the container with tap water after which the required amount of component is added to the water by the dosing unit so that the container is filled with the desired aqueous liquid.

Other kinds of components like other kinds of salt or other kinds of solid elements or a liquid with a higher concentration of salt as required in the liquid to which the component is are also possible. Other kinds of liquid than water to which the component is added are also possible.

In this manner a relatively large amount of liquid with the desired properties can easily be obtained, wherein for each new egg the liquid can be added in a relatively small amount to the cavity. Another advantage is that in this manner a number of eggs will be prepared with liquid having the same properties. The large amount of liquid in the container is for example 1-3 liter, whilst for each egg a small amount of 40-100 milliliter might be needed.

An embodiment of the apparatus according to the invention is characterized in that in use by means of the dosing unit the at least one component is added to the liquid being aqueous to provide the aqueous liquid with a dielectric constant with an imaginary part, $\varepsilon''$, between 20-500 at a temperature between 0° C.-100° C. and at a microwave frequency of 2.45 GHz.

With such an aqueous liquid it is found out that a good cooking process of an egg is obtained whereby both the egg york as well as the egg white get the desired properties. The advantages of the aqueous liquid with the described dielectric constant are described in WO2012002814A1. This document is incorporated by reference in this application.

Another embodiment of the apparatus according to the invention is characterized in that the liquid is water with NaCl, preferably between 0.1-0.5 M NaCl, more preferably between 0.17-0.23 M NaCl.

Water is easily available in every household or restaurant and also salt like NaCl can easily be obtained. Furthermore, a combination of water with such an amount of NaCl is not toxic for humans.

Another embodiment of the apparatus according to the invention is characterized in that the apparatus comprises means to detect the amount of the component in a container holding the at least one component.

By detecting the amount of the component in the container a user can be warned that he needs to replace or refill the container. Furthermore, the apparatus might be prevented from being used to cook an egg until the container comprises enough of said component Another embodiment of the apparatus according to the invention is characterized in that the apparatus comprises means to detect the amount of the component in the liquid.

By detecting the amount of the component in the liquid a user can be warned that the liquid does not have the desired properties to cook the egg properly if the amount is for example, below or above a desired threshold. The user may need to refill the container holding the liquid with fresh water, and/or he may need to replace or refill the container holding the at least one component. Furthermore, the apparatus might be prevented from being used to cook an egg until the amount of the component in the liquid is below or above a desired predetermined threshold. The means to detect the amount of the component in the liquid may comprises two spaced apart electrodes located inside the container, whereby the electric current between the electrodes is being measured and provides a value being dependent on the amount of component, like NaCl in the liquid. Preferably alternating current is being used to prevent electrolysis. Also other kind of means to detect the amount of the component in the liquid can be used.

The means to detect the amount of the component in the liquid can also be used to detect whether there is a liquid in the container.

The invention also relates to a dosing unit for dispensing at least one component, suitable for the above described apparatus by means of which dosing unit a component can easily be delivered in a desired amount.

This object is achieved by the dosing unit according to the invention in that the dosing unit comprises a container for holding the at least one component and a housing for holding the container, which housing is provided with a driving unit, which container is provided with a feeding device and an opening, wherein the driving unit is detachably coupled to the feeding device to feed the component from the container through the opening.

An advantage of such a dosing unit wherein the container is detachably connected to the housing, is that an empty container can easily be replaced by a new full container. The housing with the driving unit can be form part of an apparatus like the apparatus as described above. The container can be intended for a single use whilst the housing can be used during the lifetime of the apparatus.

By having the component feeding device integrated in the container, the user does not need to bring the component feeding device in contact with the component in the container, thereby avoiding contamination of the component.

An embodiment of the dosing unit according to the invention is characterized in that the feeding device is a rotatable feed screw.

With such a feed screw a component ca easily be transported in axial direction of said rotatable feed screw.

Another embodiment of the dosing unit according to the invention is characterized in that the driving unit comprising a pen, wherein the pen is movable against spring force from a first position wherein the pen is coupled with the component feeding device to a second position wherein the pen is decoupled from the feeding device, or vice versa.

With such a pen the driving unit can easily be connected and disconnected from the component feeding device.

Another embodiment of the dosing unit according to the invention is characterized in that the housing is provided with a pivotable cover being pivotable from a closed to an open position, which housing comprises means to move the pen from the first coupled position to the second decoupled position by pivoting the cover from its closed position to its open position and vice versa.

As long as the cover is closed the driving unit is connected by means of the pen to the component feeding device. As soon as the container needs to be removed from the housing, a user will open the cover, whereby automatically the driving unit is disconnected from the component feeding device and the component feeding device can freely be moved out of the housing.

Another embodiment of the dosing unit according to the invention is characterized in that the means comprises a wedge being movable in a direction perpendicular to an axis of the pen which wedge is in abutment with a flange of the pen at least in the decoupled position of the pen.

With such a wedge the flange and the pen provided with the flange can easily be moved in an axial direction of the pen.

Another embodiment of the dosing unit according to the invention is characterized in that the dosing unit comprises means to detect the presence of the at least one component in the container.

By detecting the amount of the component in the container a user can be warned that he needs to replace or refill the container.

Another embodiment of the dosing unit according to the invention is characterized in that the means comprises an optical emitter and receiver positioned on opposite sides of the container, which container is at least in an optical path between the emitter and the receiver transparent for light emitted by the emitter.

With such optical emitter and receiver the amount of component in the container can be detected from the outside of the container, thus preventing physical contact between the optical emitter and receiver and the component.

The invention also relates to a container for holding at least one component, suitable for the above described dosing unit by means of which container a component can easily be provided to a dosing unit This object is achieved by the dosing unit according to the invention in that the container for holding the at least one component is provided with a component feeding device for feeding component through an opening of the container.

By having the component feeding device integrated in the container, the user does not need to bring the component feeding device in contact with the component in the container, thereby avoiding contamination of the component. Furthermore, by using a feeding device, the amount of component added to the liquid can easily be controlled.

All kind of feeding devices for transporting a liquid component or a solid component comprising small particles can be used.

An embodiment of the container according to the invention is characterized in that the component feeding device extends from the opening to a passage located opposite of the opening, wherein near the passage in use a driving unit is detachable connectable to the component feeding device.

As the opening and passage are located on opposite sides physical contact between the component leaving the opening and the driving unit located near the passage is easily being prevented. Below the opening preferably a container holding the liquid is located so that the component can directly be added to the liquid in the container.

Another embodiment of the container according to the invention is characterized in that the component feeding device is a rotatable feed screw.

Such a feed screw is relatively cheap and can easily be made by injection molding, for example. In case of a disposable container, the demanded life time is limited.

Another embodiment of the container according to the invention is characterized in that the container for holding the at least one component is made of food approved material such as polypropylene or polystyrene With such material the container can be used as a package for NaCl, for example, for the cooking of an egg with the above described apparatus.

Another embodiment of the container according to the invention is characterized in that the container for holding the at least one component comprises a cap for closing the opening.

By the cap, the component inside the container is prevented from leaving the container, but more important the content of the container is being prevented from being contaminated and being protected against humidity.

Another embodiment of the container according to the invention is characterized in that the container holding the at least one component is sealed.

By sealing the container after it has been filled with the at least one component, the content of the container is being prevented from being contaminated and being protected against humidity.

Another embodiment of the container according to the invention is characterized in that the at least one component located inside the container is powdery.

A powdery component can easily be transported by means of the component feeding device, like the rotatable feed screw.

Another embodiment of the container according to the invention is characterized in that the at least one component comprises NaCl.

NaCl is a component which can easily be transported by means of the component feeding device, like the rotatable feed screw to be added to a liquid, like for example water. By holding NaCl and if necessary other components in the container which is completely sealed and can only be opened by removing the cap, the component is being prevented from being contaminated and being protected against humidity. In this manner the content of the container will stay dry during transport and storing of the container, thus avoiding problems with clogging due to humidity.

Another embodiment of the container according to the invention is characterized in that the container holds between 500 gram and 2000 gram of NaCl.

Such an amount can easily be carried and will be suitable for 200-1000 eggs, when used in the above described apparatus.

The invention also relates to a method for cooking at least one egg with an eggshell in an apparatus comprising a housing provided with a device for providing microwave radiation in a confined space in the housing and a holder located in the confined space, which holder being provided with at least one cavity adapted to the shape of the egg with the eggshell, which holder comprises at least a first holder part and a second holder part being movable with respect to each other between a first position in which an egg with an eggshell can be positioned in the cavity to a second position wherein the holder parts enclose the cavity, which apparatus further comprises means to insert a liquid into the holder for filling the cavity with the liquid to at least partly surround the eggshell of the egg located in the cavity, by means of which method the liquid can easily be provided with a desired component.

This object is achieved by the method according to the invention in that the apparatus comprises a container for holding the liquid and a dosing unit, wherein by means of the dosing unit at least one component is added to the liquid.

In this manner a relatively large amount of liquid with the desired properties can easily be obtained, wherein for each new egg the liquid can be added in a relatively small amount to the cavity. Another advantage is that in this manner a number of eggs will be prepared with liquid having the same properties. The large amount of liquid in the container is for example 1-3 liter, whilst for each egg a small amount of 40-100 milliliter might be needed.

An embodiment of the method according to the invention is characterized in that by means of the dosing unit the at least one component is added to the liquid being aqueous to provide the aqueous liquid with a dielectric constant with an imaginary part, $\varepsilon''$, between 20-500 at a temperature between 0° C.-100° C. and at a microwave frequency of 2.45 GHz.

With such an aqueous liquid it is found out that a good cooking process of an egg is obtained whereby both the egg york as well as the egg white get the desired properties.

Another embodiment of the container according to the invention is characterized in that the apparatus comprises means to detect the amount of the component in the liquid, wherein the at least one component is added to the liquid if the amount of the component in the liquid exceeds a predetermined threshold.

It is also possible to use instead of NaCl other components, preferable edible for humans, like $NaHCO_3$ and having the dielectric constant with the required imaginary part, $\varepsilon''$.

By detecting the amount of the component in the liquid a user can be warned that the liquid does not have the desired properties to cook the egg properly if the amount is for example, below or above a desired threshold. The user may need to refill the container holding the liquid with fresh water, and/or he may need to replace or refill the container holding the at least one component. Furthermore, the apparatus might be prevented from being used to cook an egg until the amount of the component in the liquid is below or above a desired predetermined threshold.

A BRIEF DESCRIPTION OF THE DRAWINGS

Figure 16:
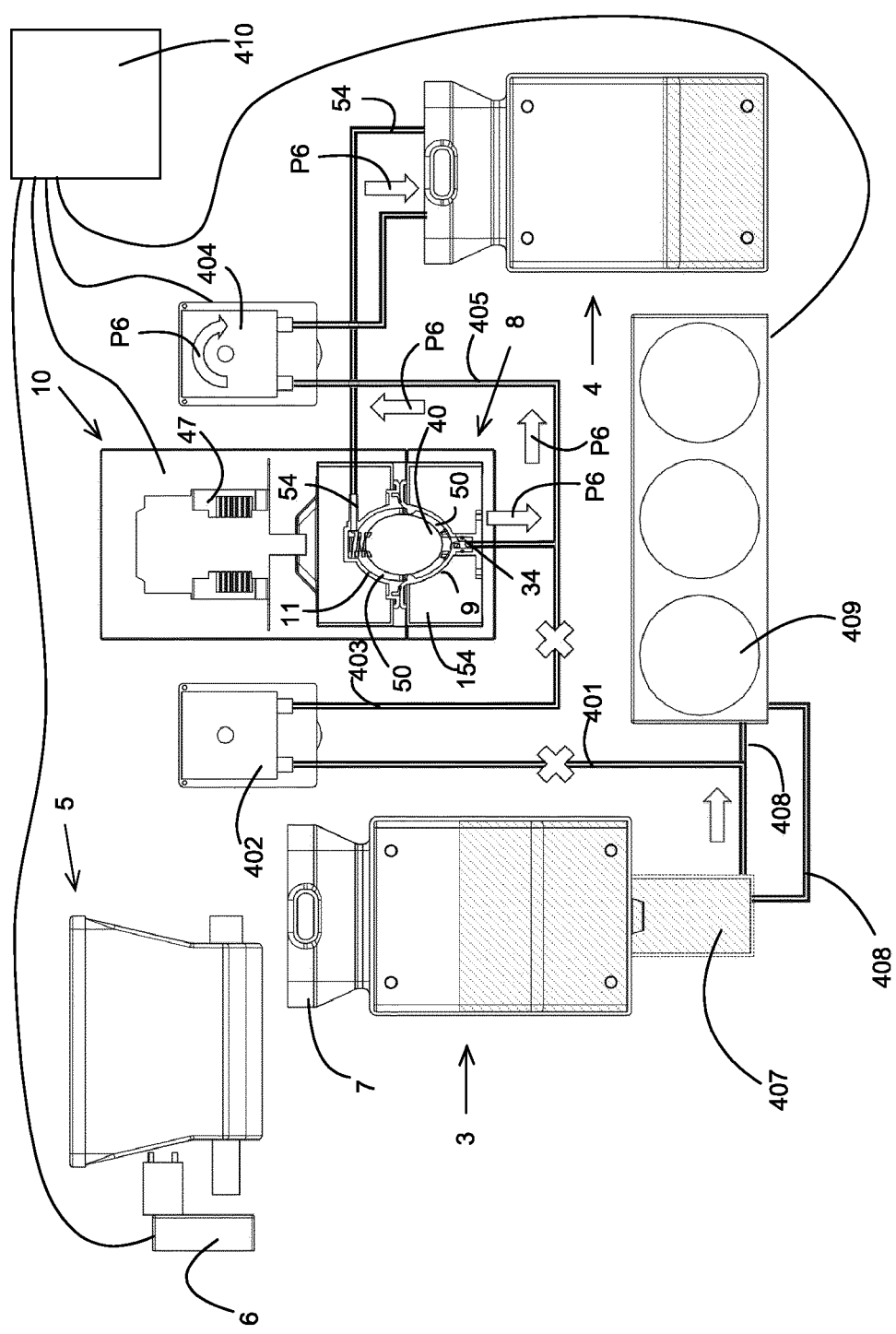
Figure 17A:
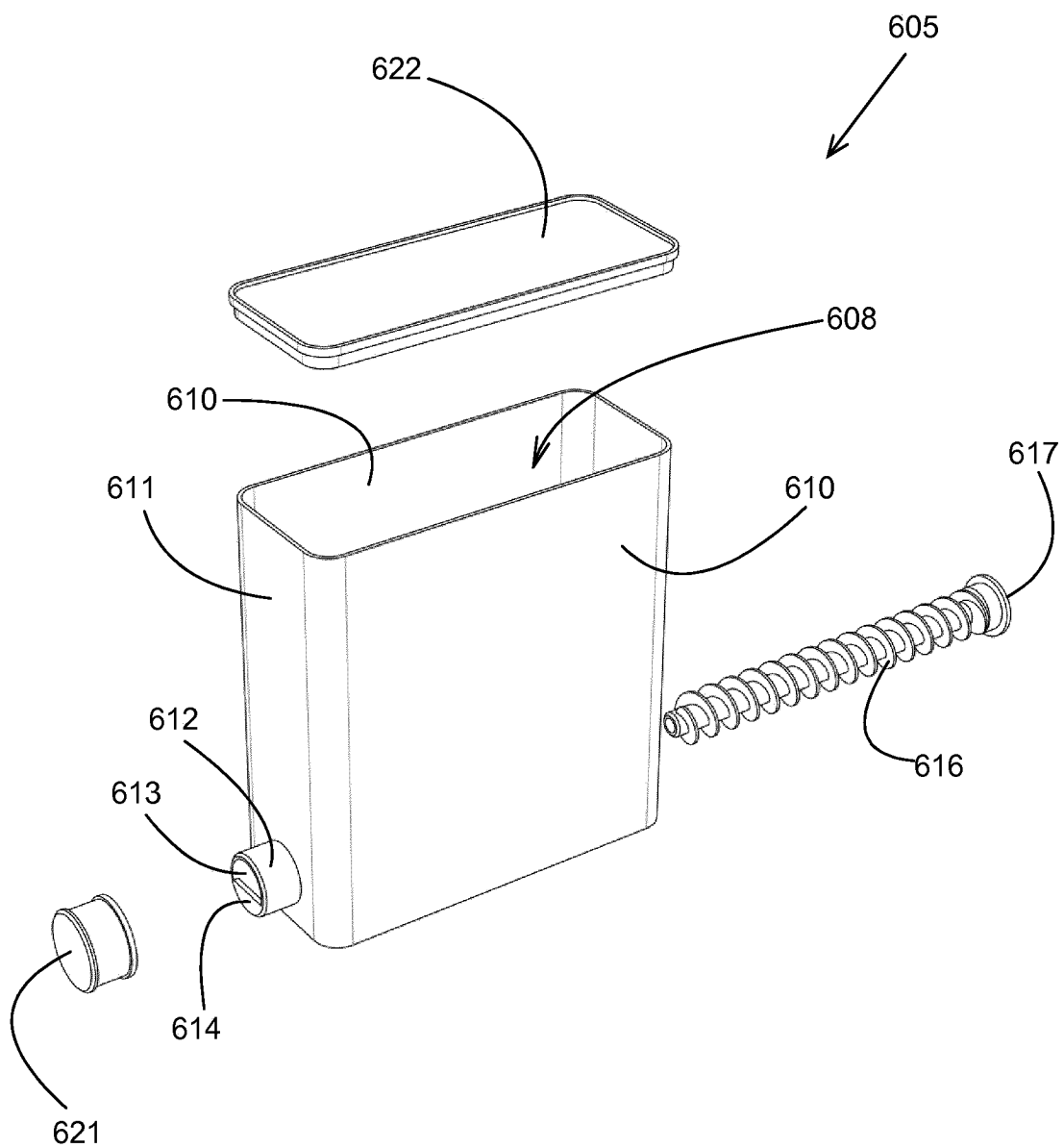
Figure 17B:
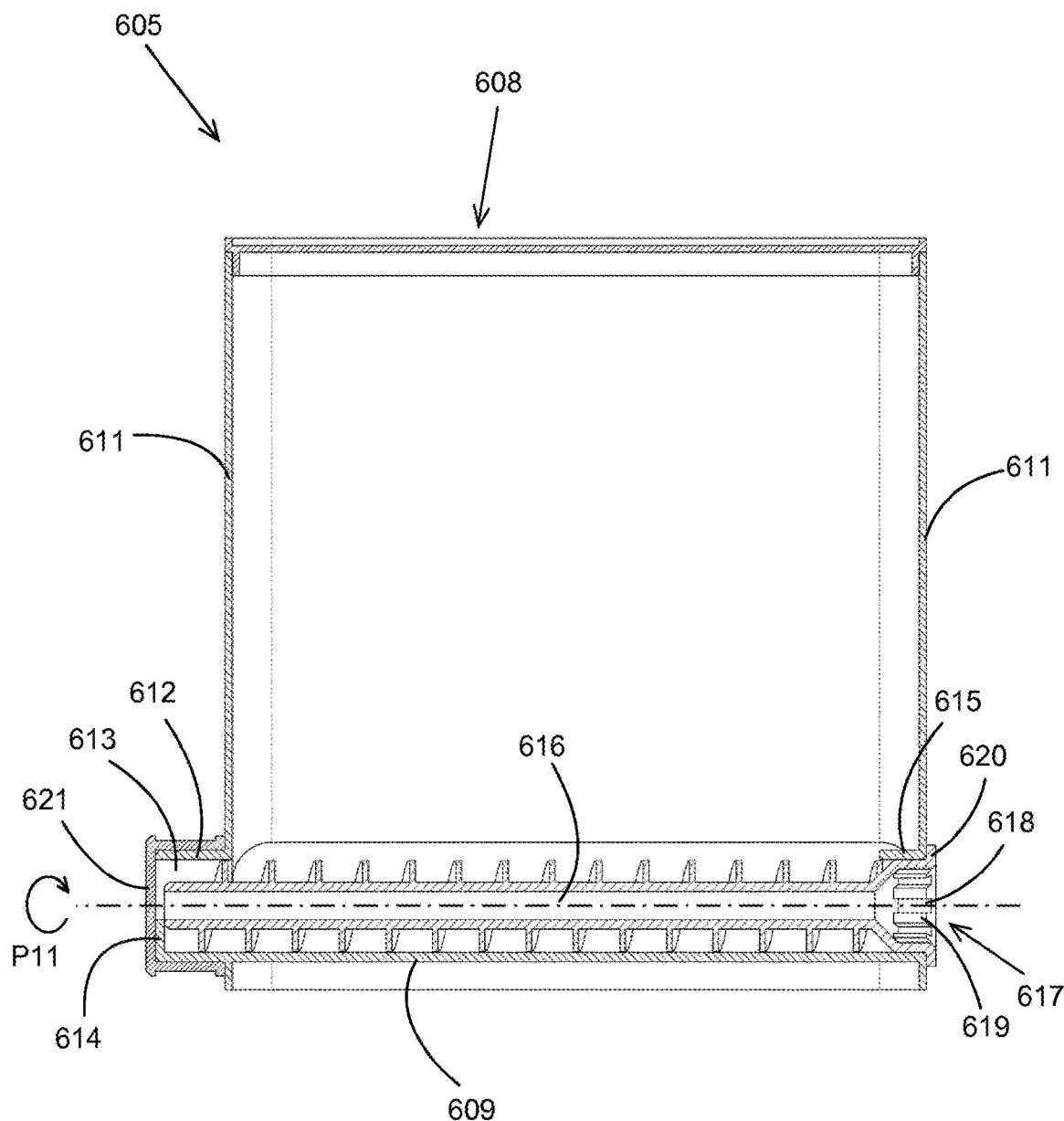
Figure 18A:
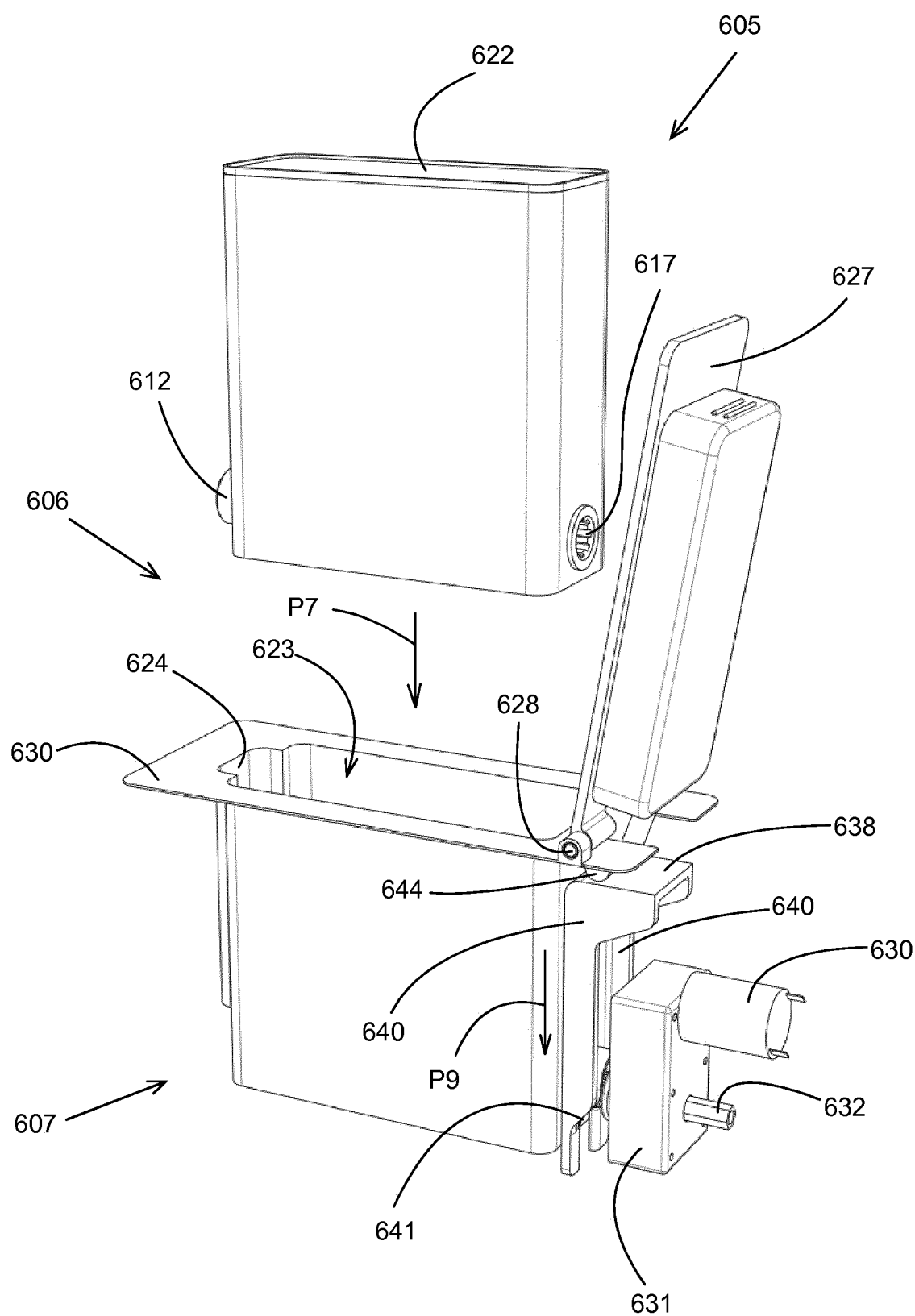
Figure 18B:
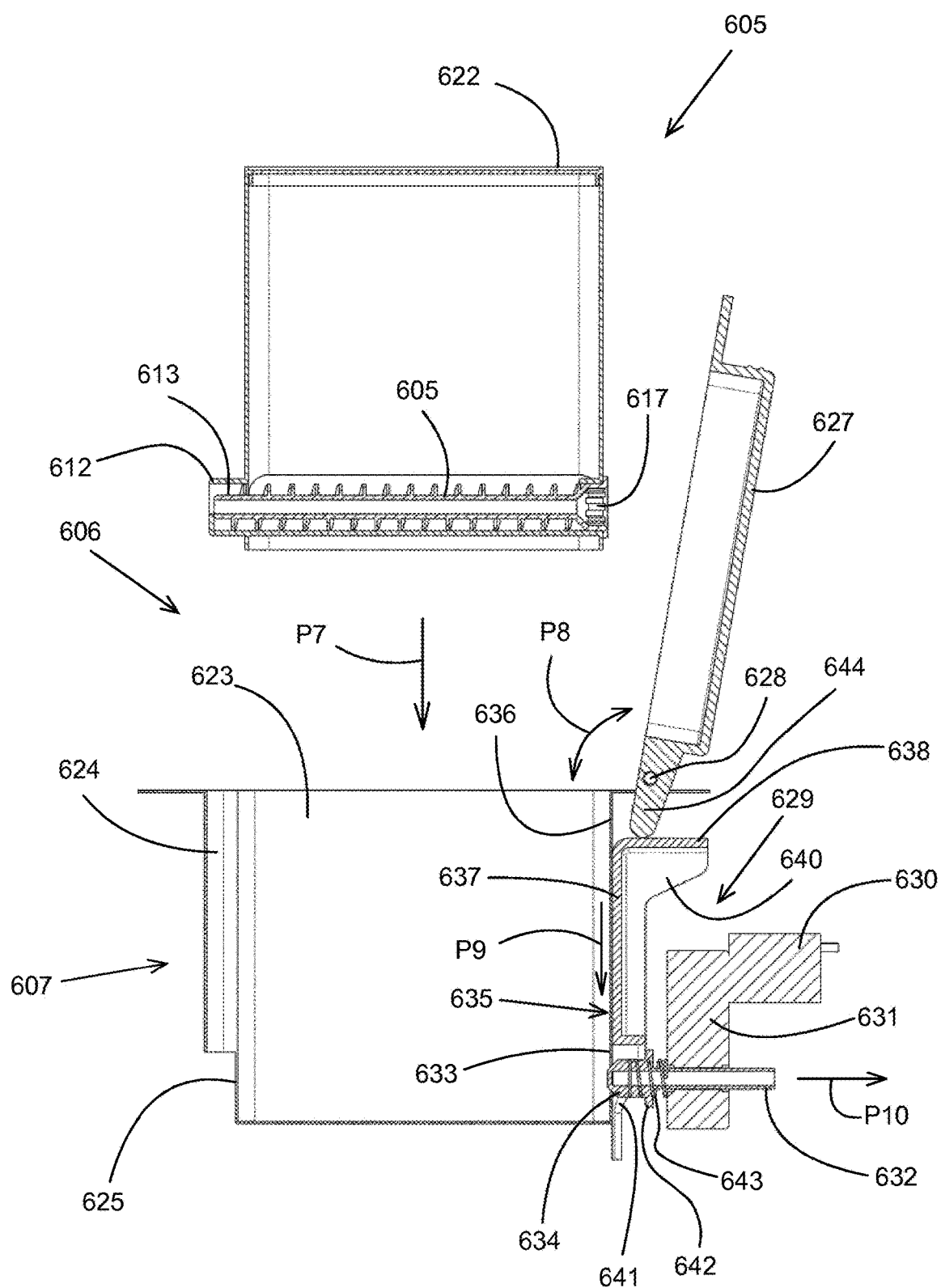

FIG. 16 shows a working scheme of the apparatuses as shown in the FIGS. 6a-6b, 9, 11, 13 during emptying of the cavity after cooking of the egg, FIGS. 17A-17D show an exploded perspective view, a cross section a perspective front view and a perspective rear view of a container for holding at least one component, FIGS. 18A and 18B show a perspective view and a cross section of a dosing unit according to the invention, when positioning the container as shown in FIGS. 17A-17D, in the housing of the dosing unit.

Figure 19A:
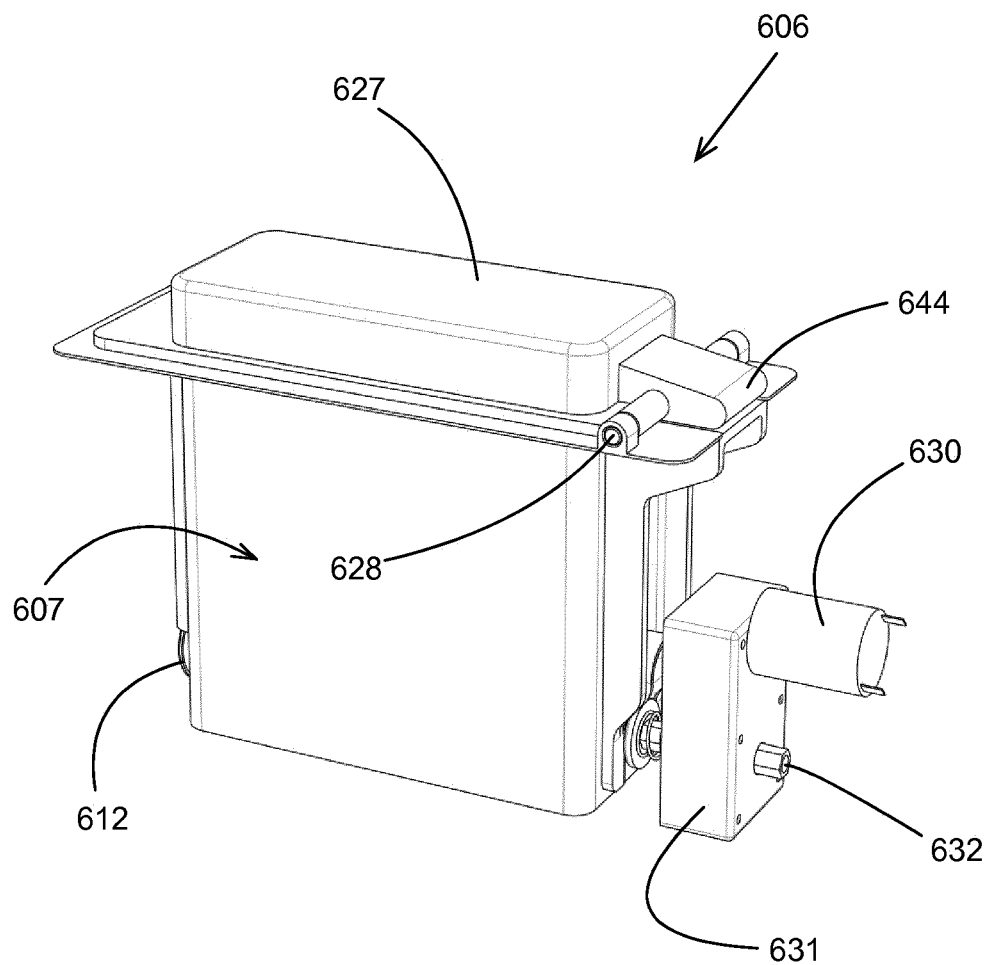
Figure 19B:
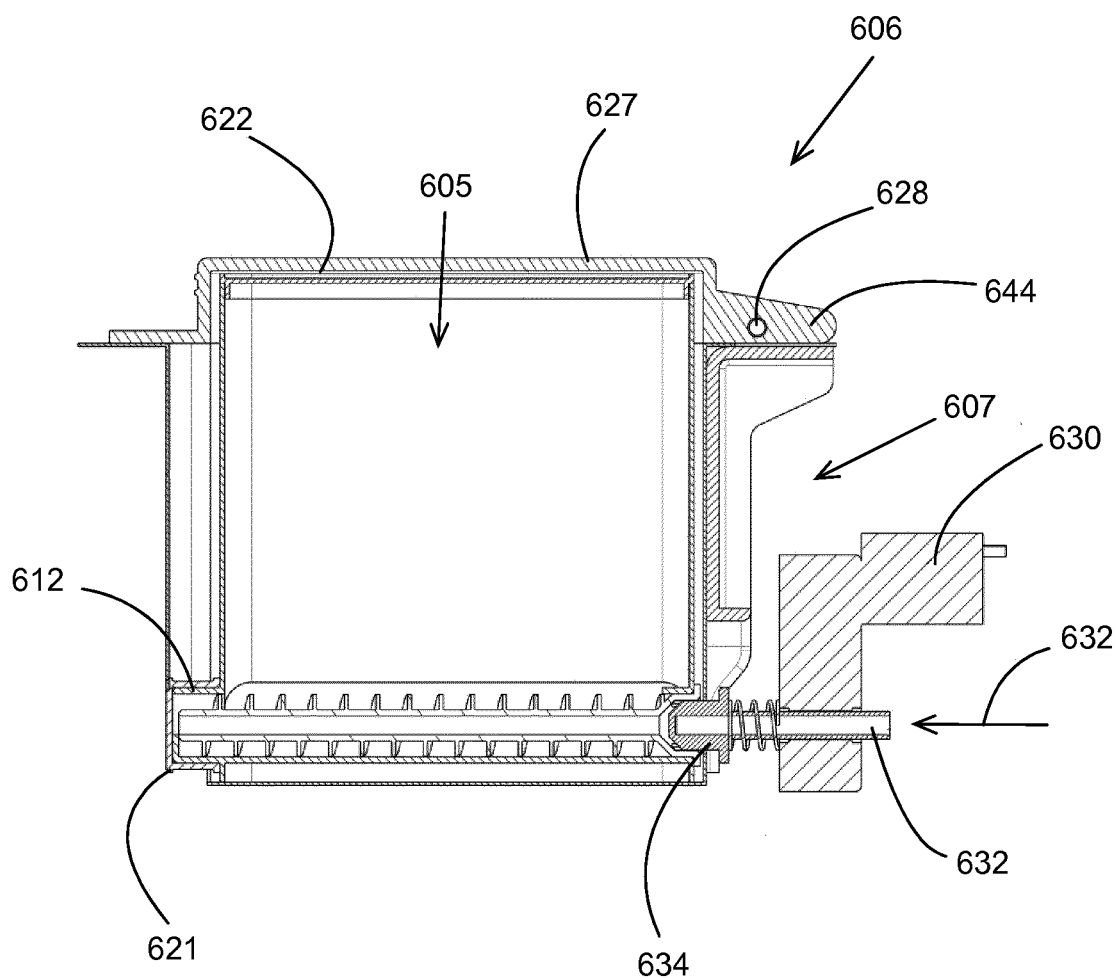

FIGS. 19A and 19B show a perspective view and a cross section of the dosing unit as shown in FIGS. 18A and 18B with the container as shown in FIGS. 17A-17D located in the housing of the dosing unit.

Figure 20:
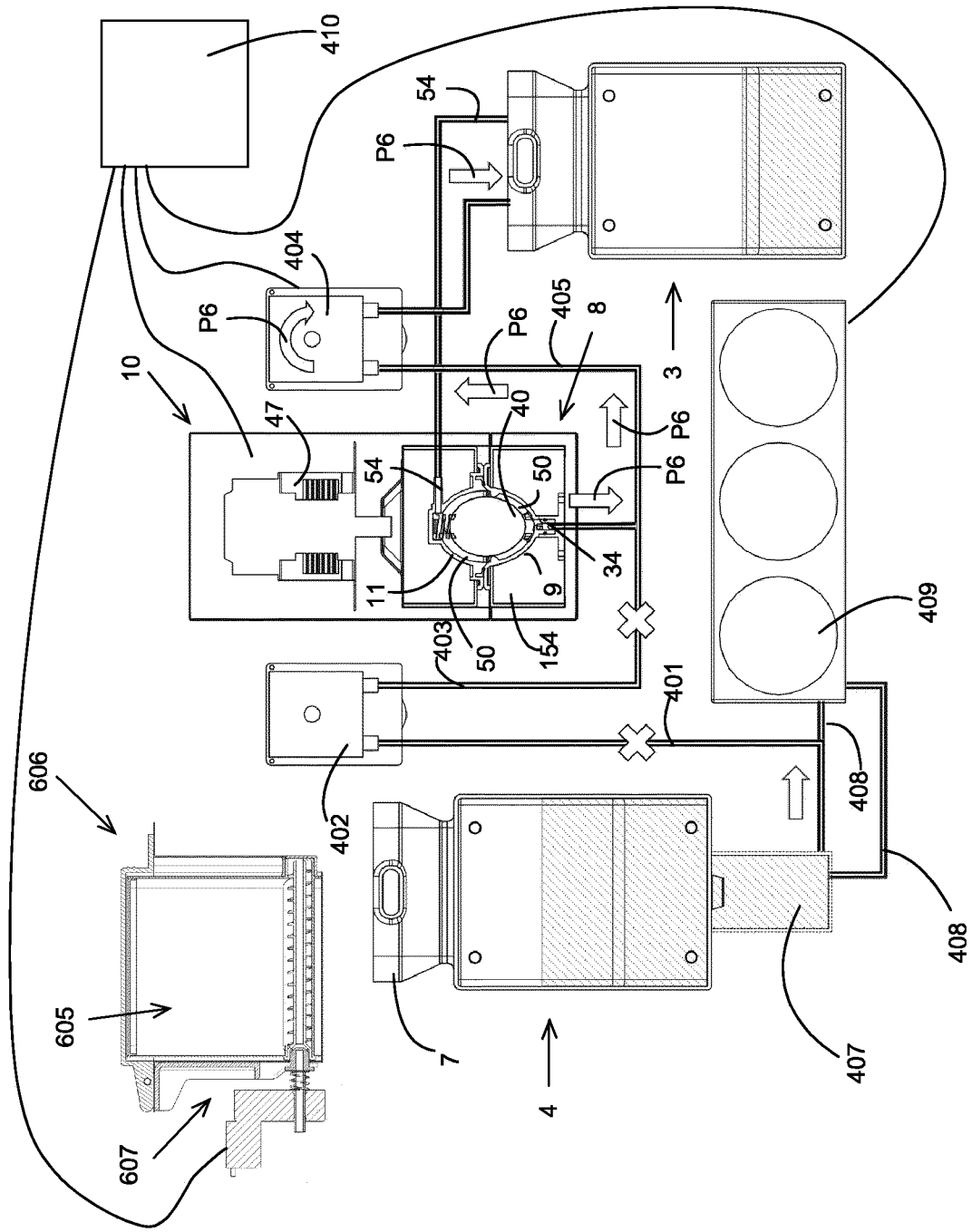

FIG. 20 shows a working scheme of the apparatus comprising the dosing unit as shown in the FIGS. 17A-19B during the filling of the cavity and the cooking of the egg.

In the drawings like reference numerals refer to like elements.

DESCRIPTION OF PREFERRED EMBODIMENTS

FIGS. 1a-7 show different views of a first embodiment of an apparatus 1 according to the invention and specific parts thereof. From the apparatus 1 only relevant components are shown and other components like covers and mounting constructions for mounting elements in the apparatus are left out for reason of clarity.

Figure 1A:
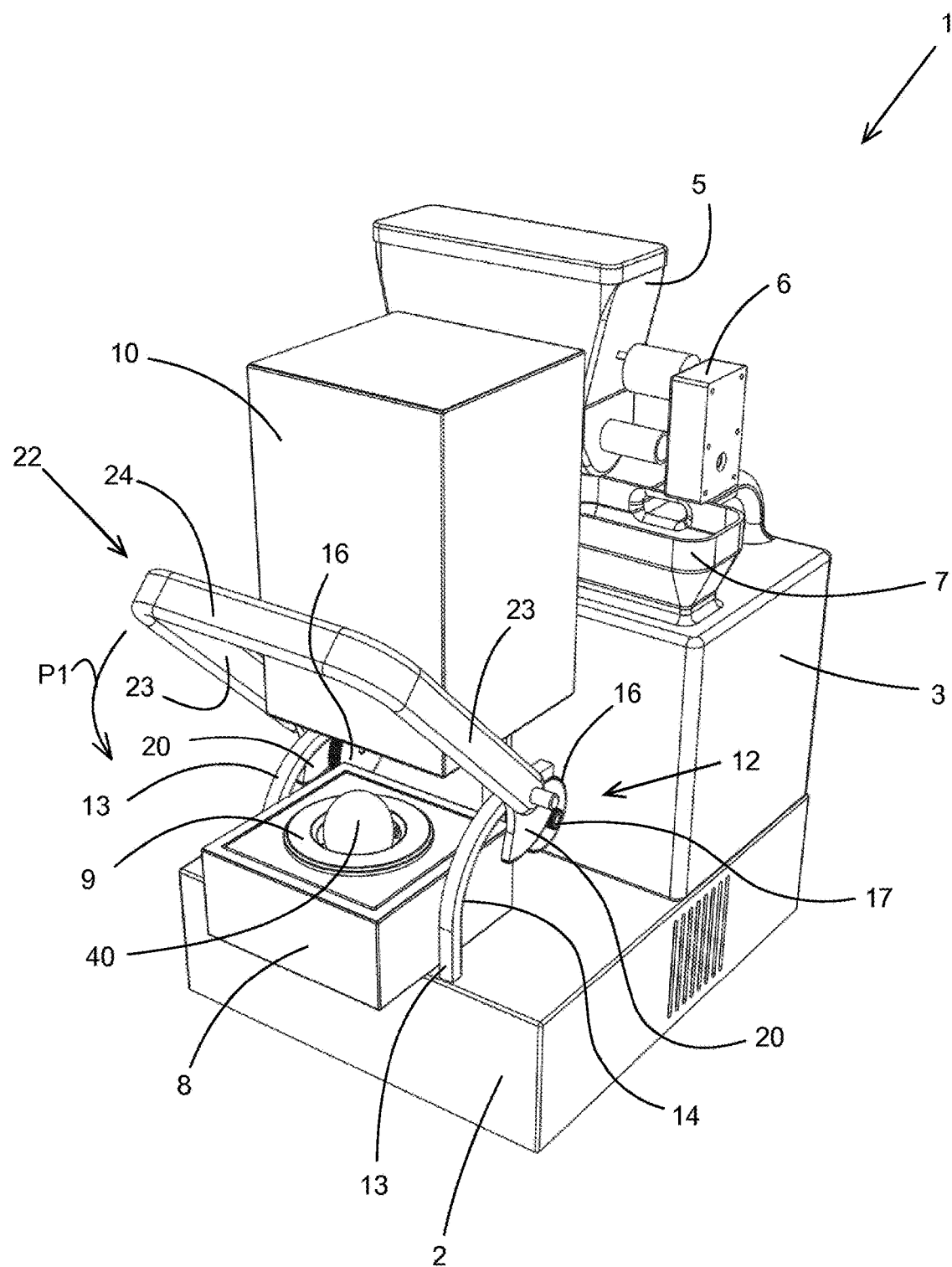
FIGS. 1a and 1b show a perspective front view and rear view of a first embodiment of an apparatus according to the invention in an open position of the housing parts.
Figure 1B:
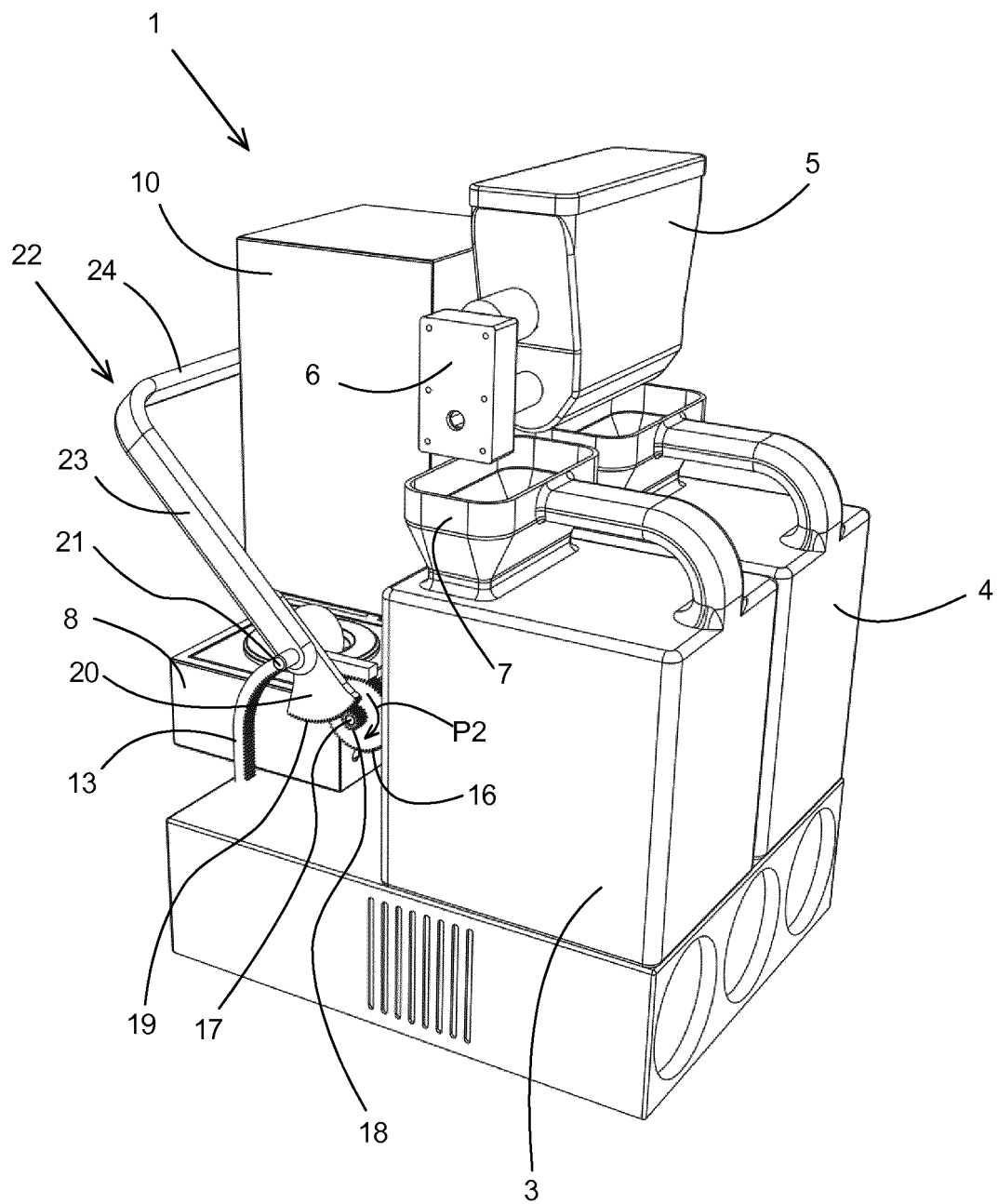
Figure 1C:
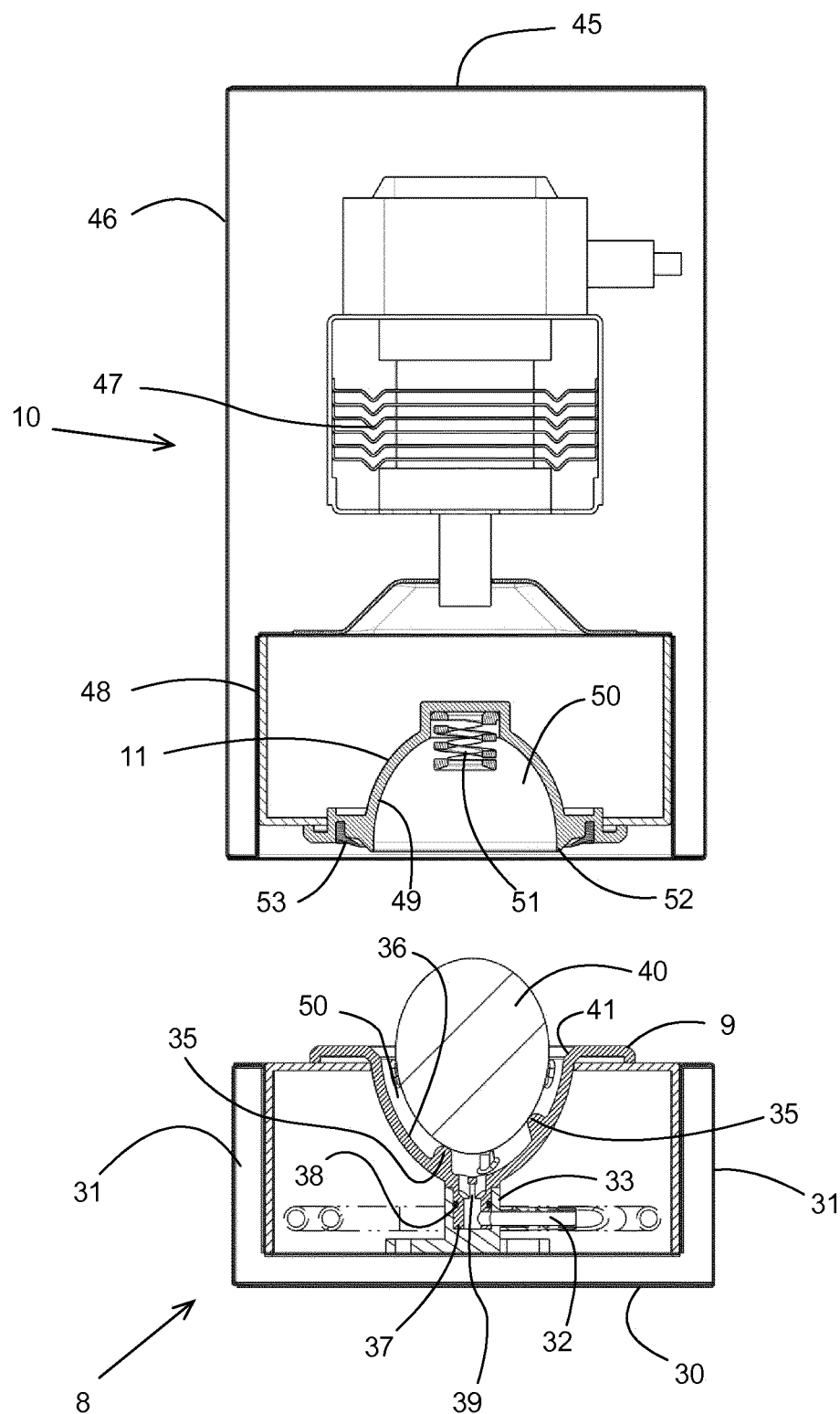
FIG. 1c shows a cross section of a part of the apparatus as shown in FIGS. 1a-1b.
Figure 2:
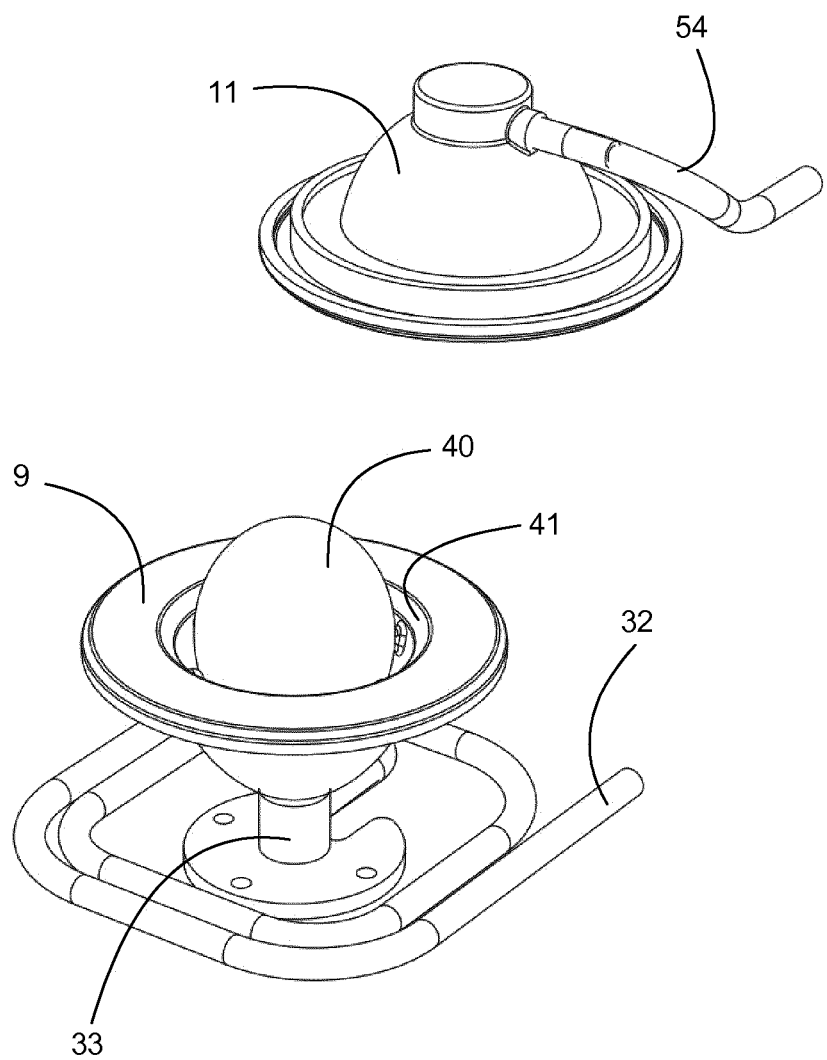
FIGS. 2-4 show perspective views of parts of the apparatus as shown in FIGS. 1a-1c.
Figure 3:
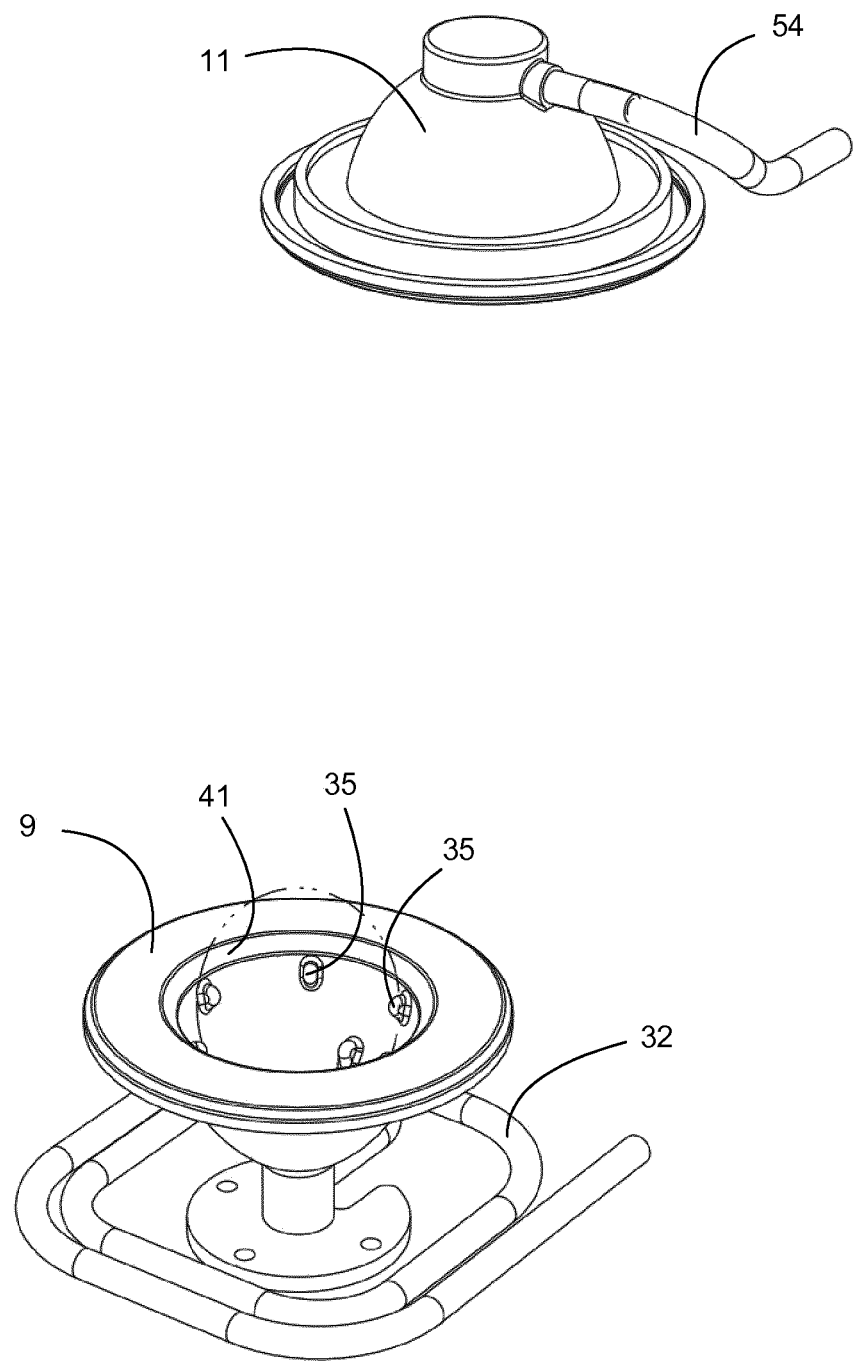
Figure 4:
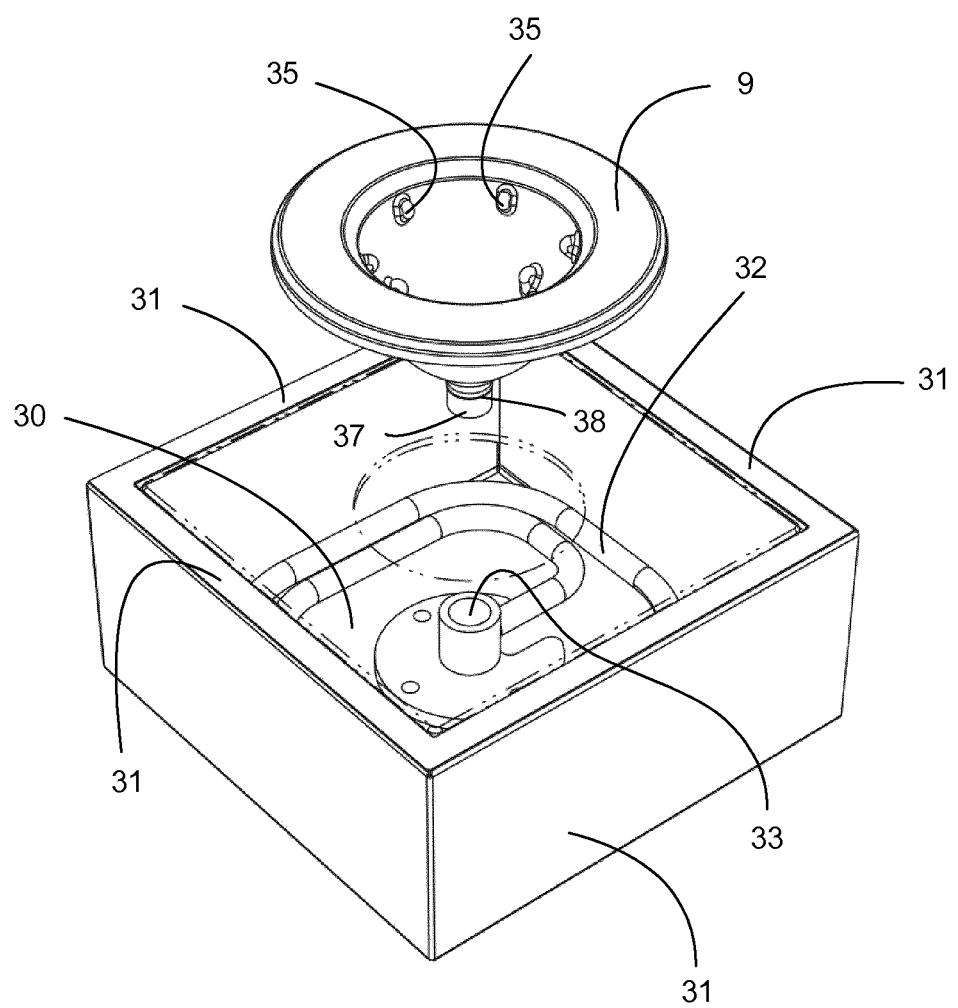
Figure 5:
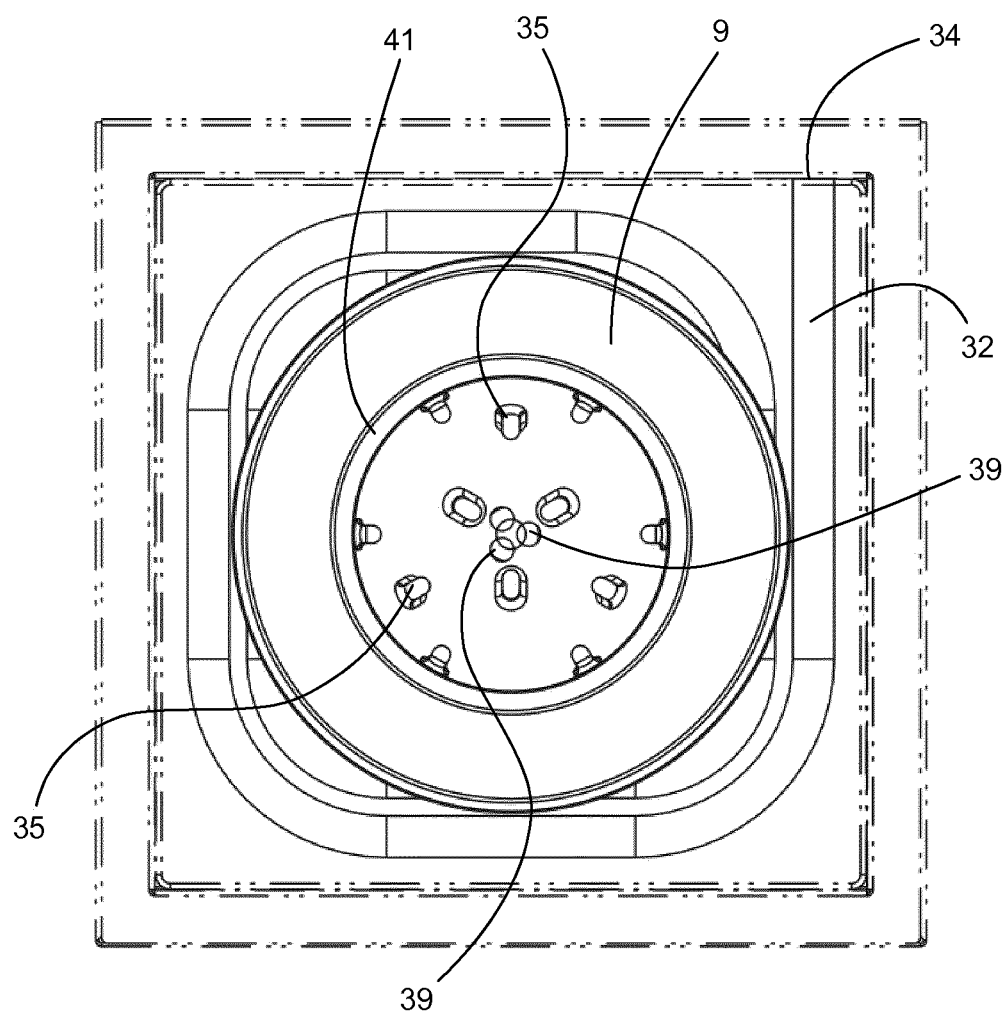
FIG. 5 shows a top view of the part as shown in FIG. 4.
Figure 6A:
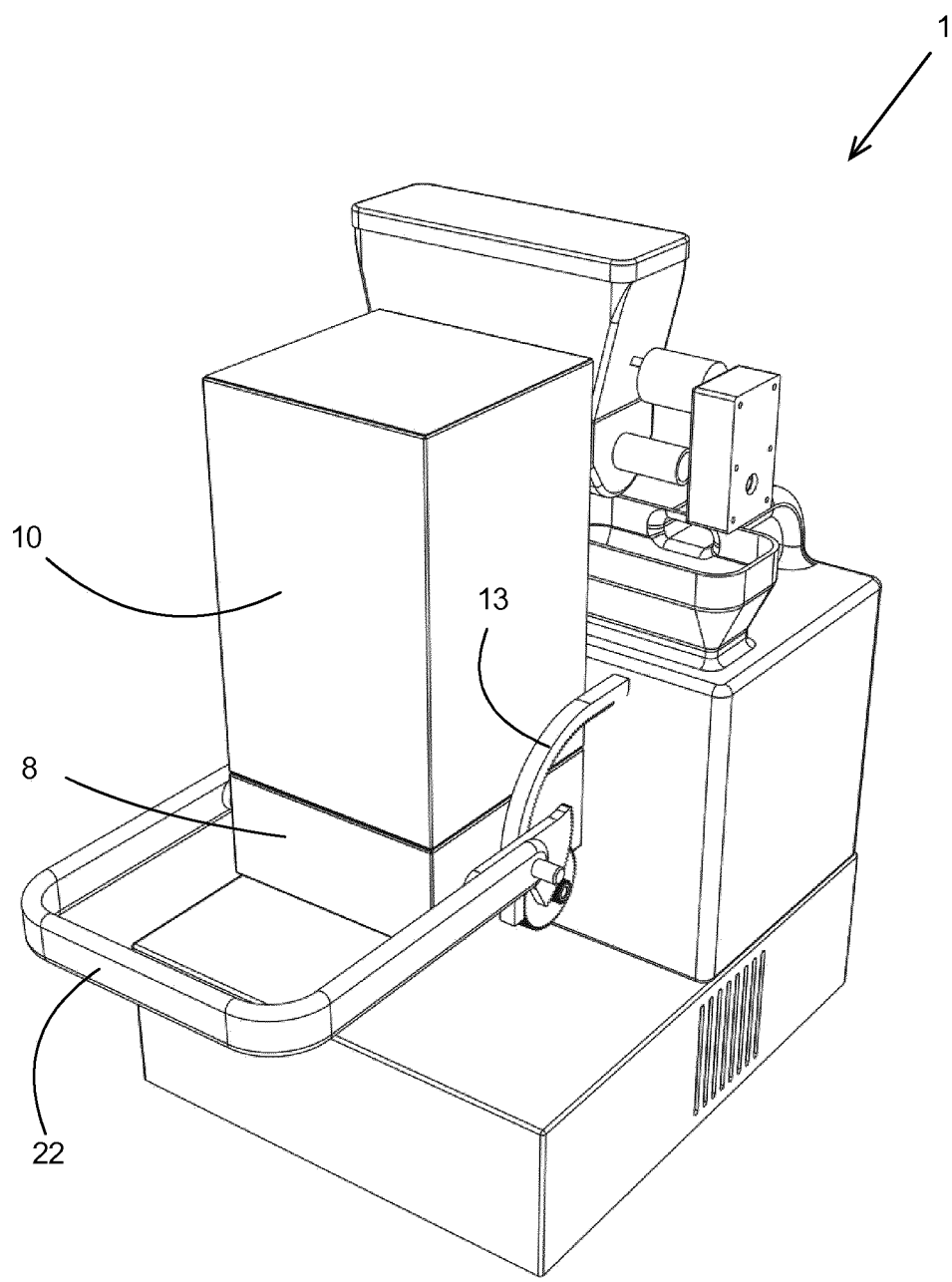
FIGS. 6a and 6b show a perspective front view and rear view of the apparatus as shown in FIGS. 1a-1b in a closed position of the housing parts.
Figure 6B:
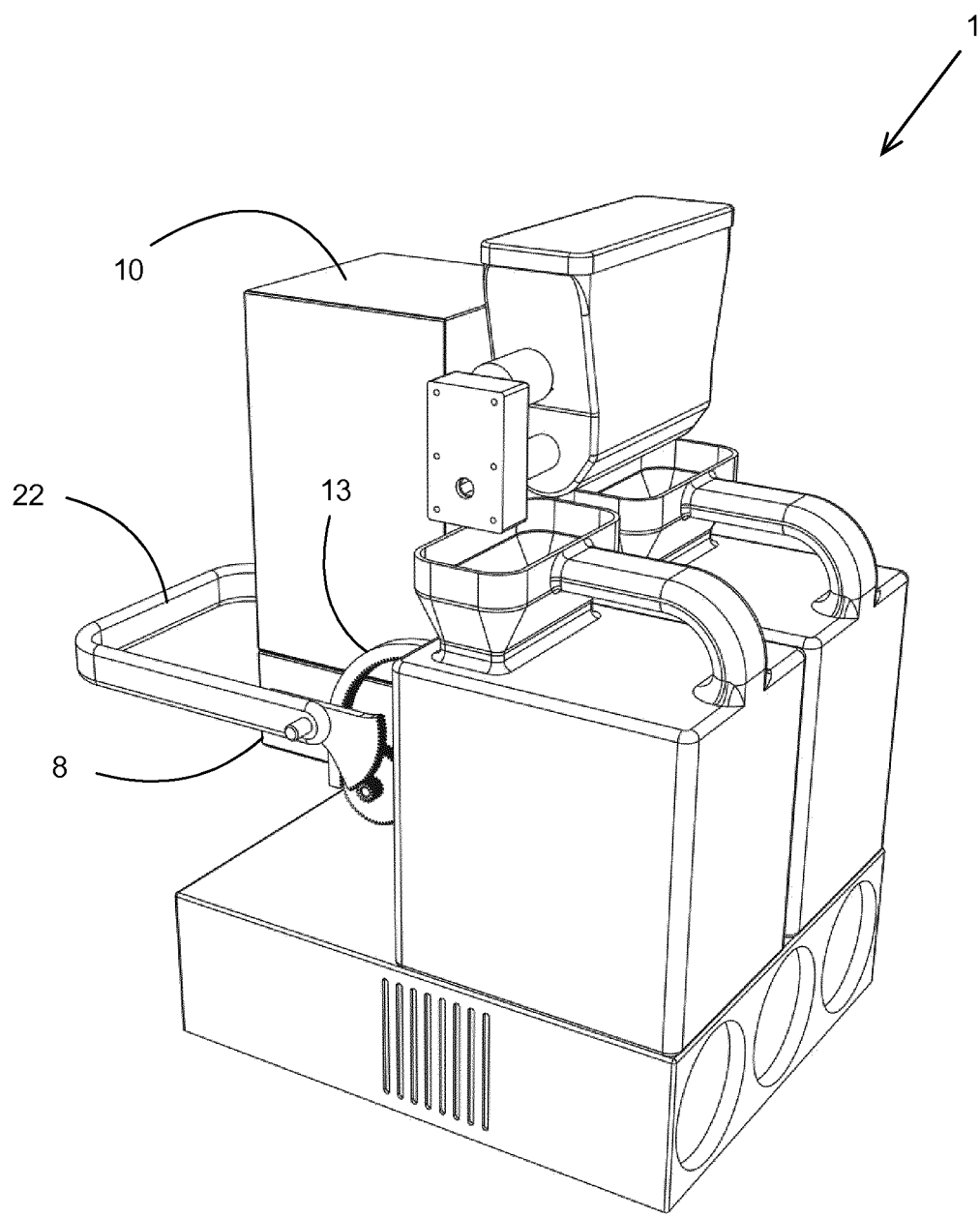
Figure 6C:
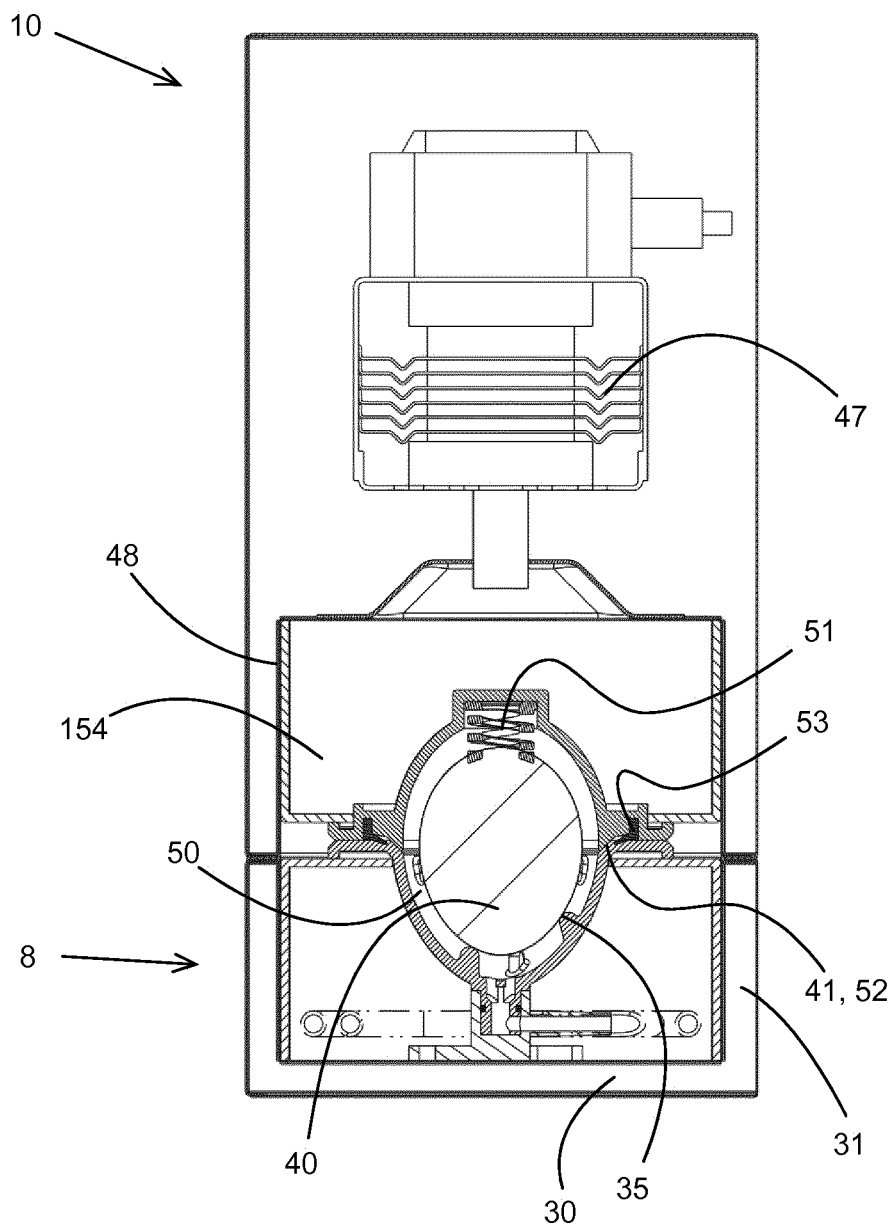
FIG. 6c shows a cross section of the apparatus as shown in FIGS. 6a-6b.
Figure 7:
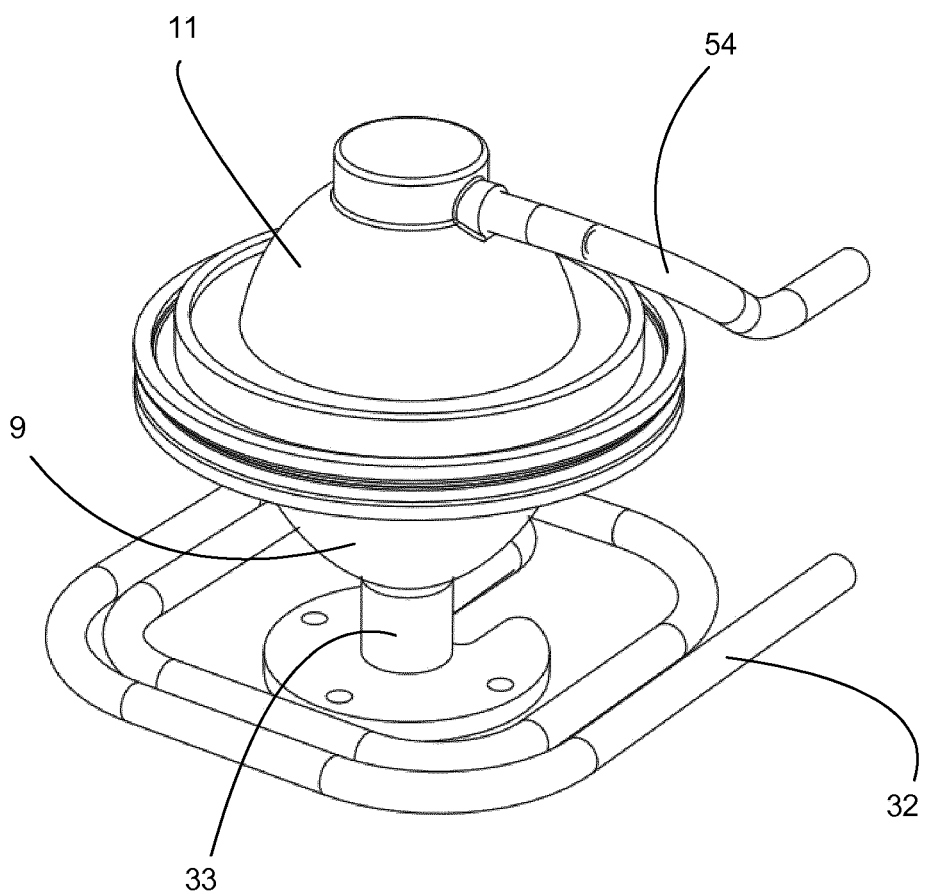
FIG. 7 shows a perspective view of a part of the apparatus as shown in FIGS. 6a-6c.

The apparatus 1 comprises a base 2 on which two containers 3 and 4 are located. Above the containers 3 and 4 a container 5 is located which container is provided with a dosing unit 6. The dosing unit 6 is located above an opening 7 of the container 3. The apparatus 1 further comprises a first housing part 8 with a first holder part 9 as well as a second housing part 10 with a second holder part 11. The second housing part 10 is connected in the apparatus 1 to the base 2 and has a fixed relation thereto. The first housing part 8 is movable with respect to the second housing part 10 between a first open position as shown in FIGS. 1a-1c and a second closed position as shown in FIGS. 6a-6c. The first housing part 8 is movable with respect to the second housing part 10 by means of manually operated gearing mechanisms 12 located on each side of the first and second housing part 8, 10. Each gearing mechanism 12 comprises a curved rod 13 which is provided with teeth 14 on a side directed to the base 2 and the containers 3, 4. The curved rods 13 are connected on two opposite sides of the first housing part 8. Each gearing mechanism 12 further comprises a first gear wheel 16 being pivotably about a pivot axis 17 and a second gear wheel 18 having a smaller diameter than the gear wheel 16, which second gear wheel 18 being connected to the gear wheel 16 and being rotatable simultaneously therewith about the pivot axis 17. The pivot axis 17 has a fixed position in the apparatus 1. The first gear wheel 16 cooperates with the teeth 14 of the rod 13. The second gear wheel 18 cooperates with teeth 19 on a disc 20, which disc 20 is pivotable about a pivot axis 21. The pivot axis 21 has a fixed position in the apparatus 1. The disc 20 is connected on a side remote of the teeth 19 to a U-shaped handle 22. The handle 22 comprises two legs 23 located on both sides of the second housing part 10 and connected to the discs 20, which legs 23 are interconnected on sides remote of the discs 20 by means of a bridge shaped part 24. By pivoting the handle 22 about the pivot axis 21 in a direction as indicated by arrow P1 the teeth 19 on the disc 20 will cooperate with the second gear 18 and will rotate the gear 18 in a clockwise direction as indicated by arrow P2. Since the second gear 18 is connected to the first gear 16, the first gear 16 will also be rotated in clockwise direction. As the teeth of the gear 16 cooperate with the teeth 14 on the rod 13, the rotation of the gear 16 will cause the rod 13 to move along the gear 16, whereby due to the curved shape of the rods 13 the first housing part 8 will firstly be moved in a mainly horizontal direction towards the containers 3, 4, after which the first housing part 8 will be moved simultaneously towards the containers 3, 4 as well as to the second housing part 10, whereby in the final stage of movement of the first housing part 8, the first housing part 8 will be moved vertically towards the second housing part 10 to the second closed position as shown in FIGS. 6a-6c. During the whole movement both housing parts 8, 10 remain horizontal. Especially the horizontal open position of the first housing part 8 being moved forwardly away form the containers 3, 4, facilitates the placement and removal of the eggs and easily prevents the egg from falling out of the first housing part.

As can be seen in FIGS. 1c, 3-5, 6c and 7 the first housing part 8 comprises a square bottom wall 30 and four side walls 31 extending perpendicularly to the bottom wall 30. On the bottom wall 30 a spirally conduit 32 is located which opens near the middle of the bottom wall 30 in a vertically extending tube 33. The end 34 of the conduit 32 is in connection with the container 3, 4 as will be explained with reference to the FIGS. 14 and 16. The first housing part 8 is further provided with the first holder part 9, which holder part 9 has a shape of half an egg and is provided with spacers 35 extending from the wall 36 of the first holder part 9. The first holder part 9 is provided at its lowest part with a tube 37, which fits into the tube 33 in the first housing part 8. The tube 37 is provided with a sealing ring 38 on the outside thereof to provide a watertight sealing between the tubes 33 and 37. The tube 37 is provided on a side near the wall 36 with a grid comprising a number of openings 39. In case that a egg 40 located in the first holder part 9 will break, the grid will prevent parts of the egg shell and the egg to enter the tubes 37, 33 and the conduit 32. As can be seen in FIG. 1c the spacers 35 keep the eggshell of the egg 40 at a predetermined distance from the wall 36 of the first housing part 9. The wall 36 of the first housing part 9 is provided with a conical part 41 at a side directed towards the second housing part 10.

The second housing part 10 is provided with a square top wall 45 and four side walls 46 extending downwardly therefrom. Inside the walls 45, 46 a device 47 for providing microwave radiation is located. Such an device is well known in the art and will not further be explained.

Below the device 47 a square chamber 48 is located in which the second holder part 11 is mounted. The second holder part 11 is provided with an inner wall 49 having a shape of half an egg. The wall 49 of the second holder part 11 together with the wall 36 of the first holder part 9 define a cavity 50 having an egg shaped form wherein a first longitudinal end being relatively narrow is located near the bottom of the first holder part 9 whilst a second longitudinal end being relatively wide is located near a top of the wall 49. Near the top of the wall 49 a spring 51 is provided, which spring 51 rests against the second end of the egg 40 when the housing parts 8, 10 are in their first closed position (see FIGS. 6, 7), thereby pressing the egg 40 on the spacers 35 to maintain a fixed position of the egg 40 in the cavity 50.

The second holder part 11 is provided with a conical part 52, which cooperates with the conical part 41 of the first housing part 9 to facilitate the correct positioning of the first housing part 8 with respect to the second housing part 10. The second holder part 11 is further provided with a ring shaped seal 53 which rests against the first holder part 9 in the closed position, as shown in FIG. 6c and provides a water tight seal between the first holder part 9 and the second holder part 11. The second holder part 11 is connected near the top thereof to a conduit 54, which conduit 54 is in fluid communication with the container 4, as will be further explained with reference to the FIGS. 14 and 16. In the closed position as show in the FIGS. 6a-6c, microwave radiation can be generated by the device 47 in the confined space 154, which space 154 is bounded by the chamber 48 of the second housing part 10 and the walls 30, 31 of the first housing part 8. The first holder part 9 and the second holder part 11 are made from materials being transparent to microwave radiation so that microwave radiation will also reach the cavity 50 in which an egg 40 is being positioned. Such materials are well known in the art, for example as described in the above mentioned initial patent application WO2012002814A1. Before explaining the operation of the apparatus 1, other embodiments of apparatuses according to the invention will be described since the working principles of these apparatuses are mainly the same.

Figure 8A:
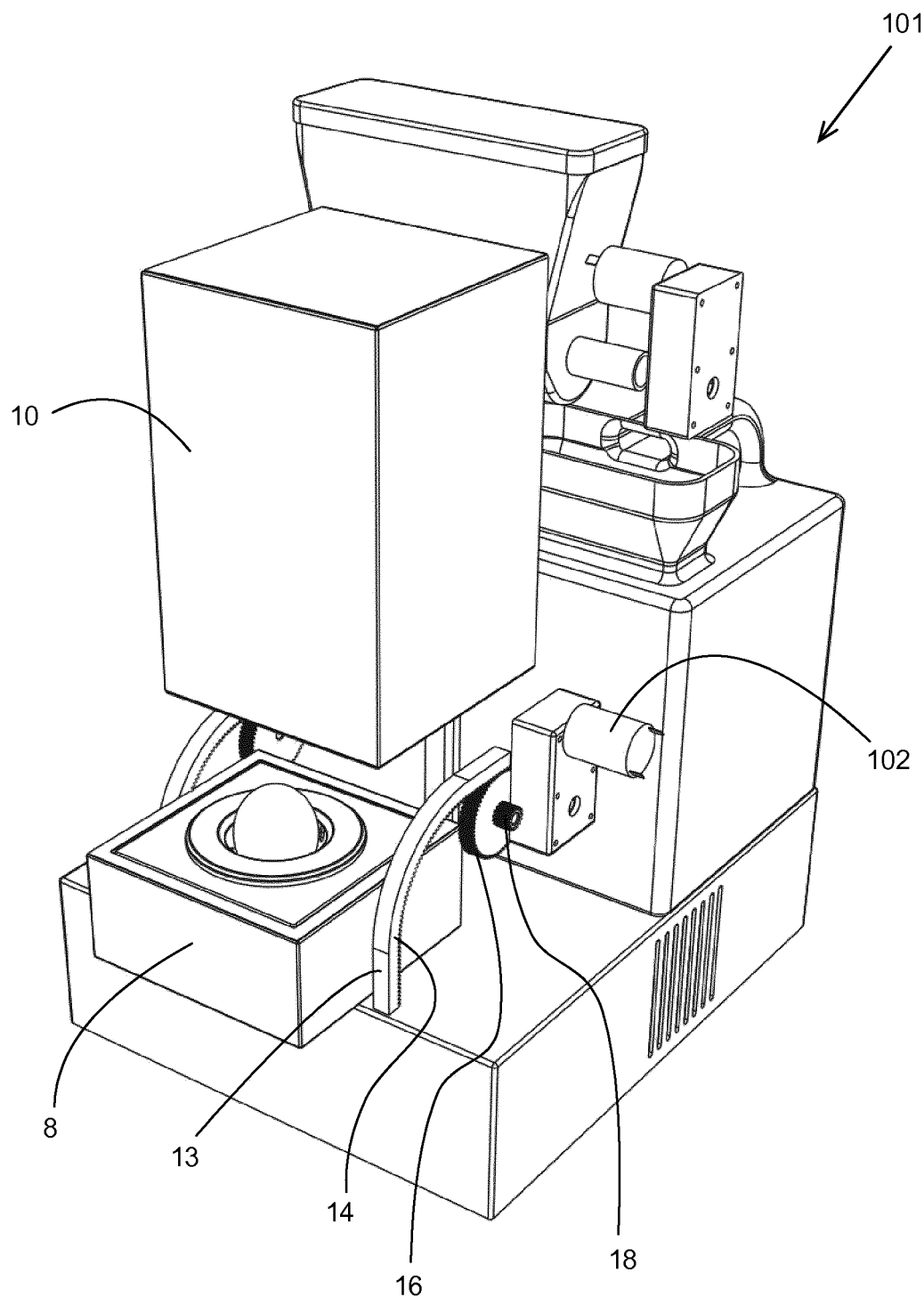
FIGS. 8a and 8b show a front and rear perspective view of a second embodiment of the apparatus according to the invention in an open position of the housing parts.
Figure 8B:
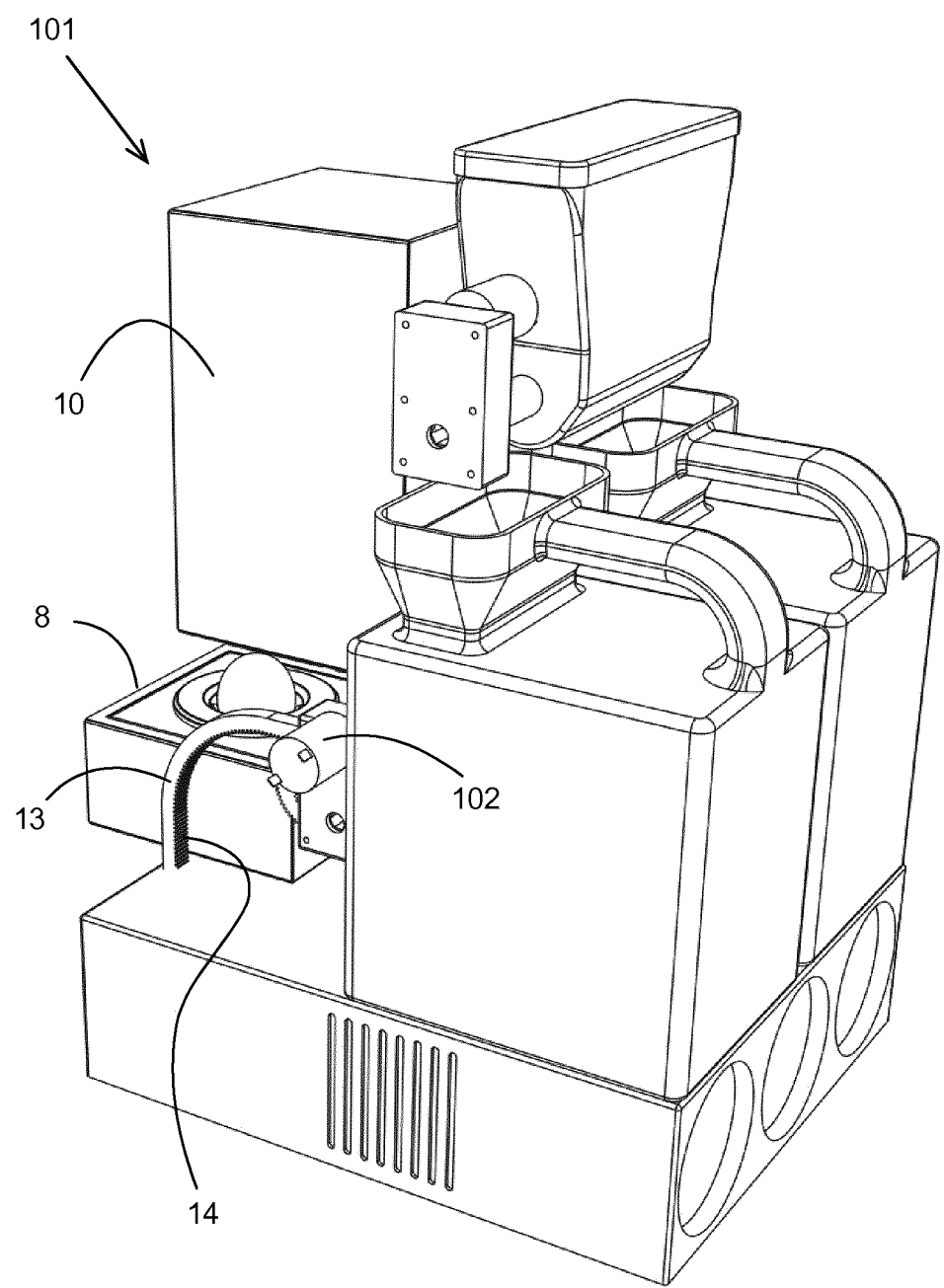
Figure 9:
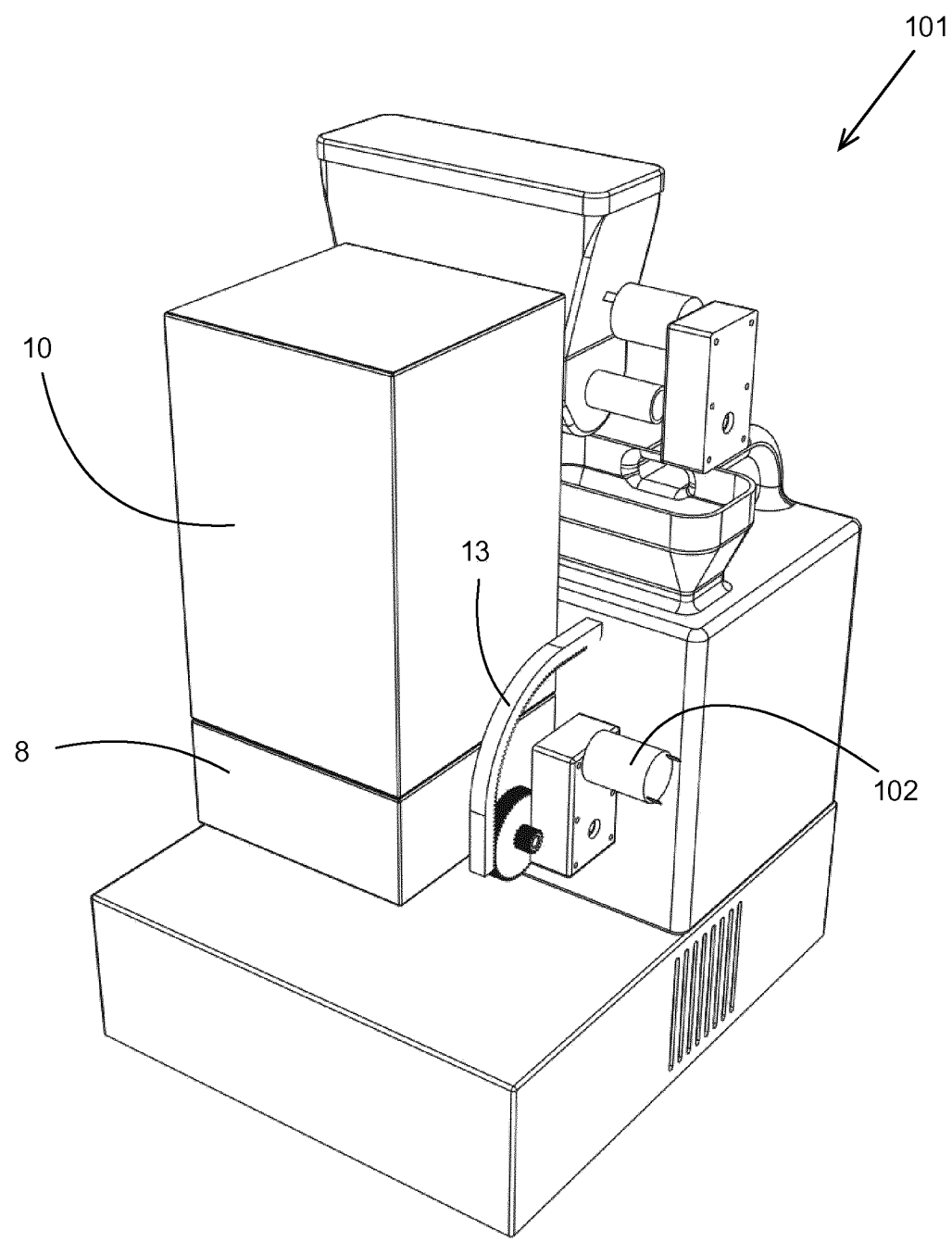
FIG. 9 shows a perspective front view and rear view of the apparatus as shown in FIGS. 8a-8b in a closed position of the housing parts.

FIGS. 8*a*-9 disclose a second embodiment of an apparatus 101 according to the invention which apparatus 101 differs from the apparatus 1 in that the gear 18 is driven by an electric motor 102 instead of by pivoting the handle 24 manually.

Figure 10A:
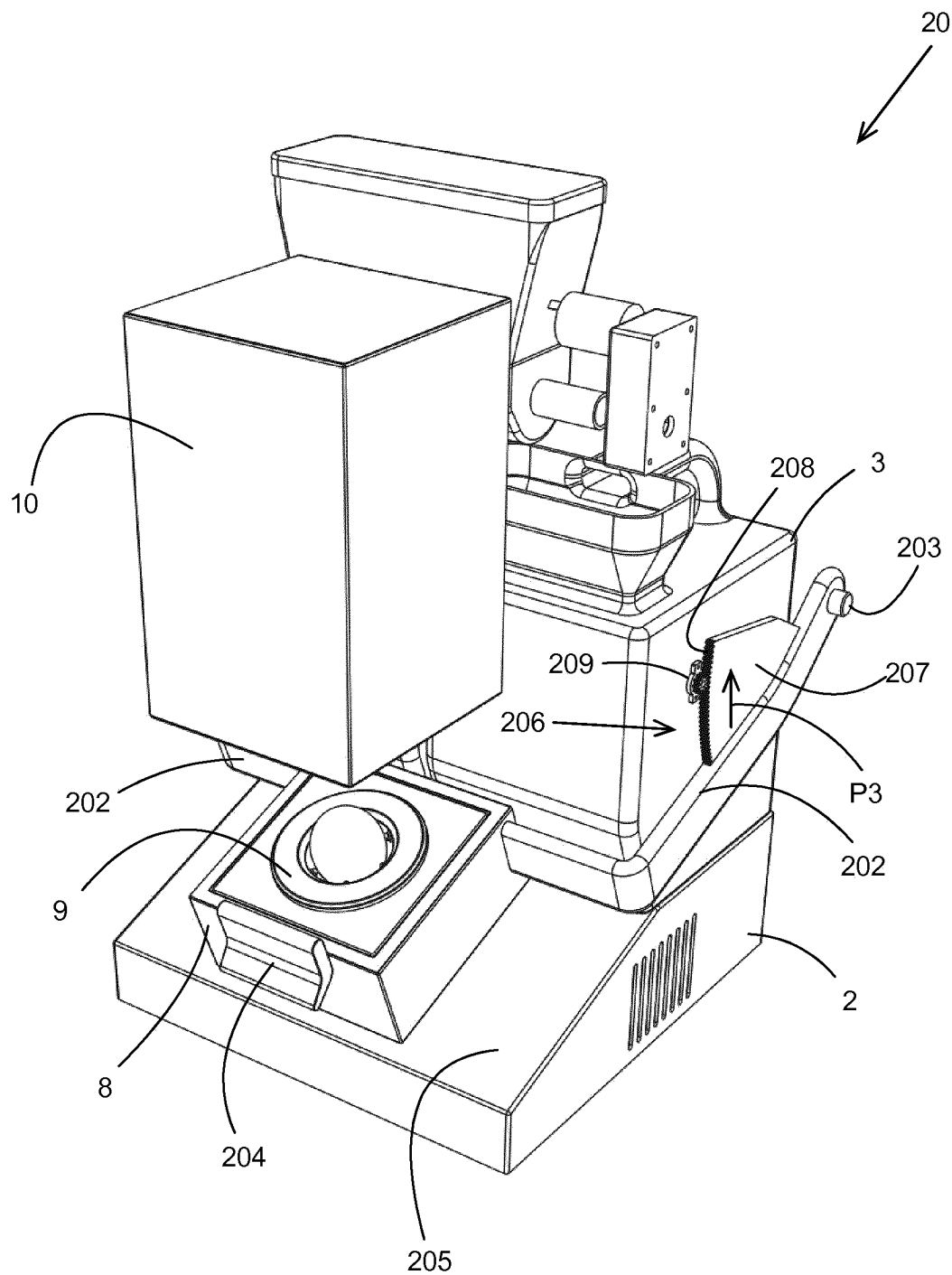
FIGS. 10a and 10b show a front and rear perspective view of a third embodiment of the apparatus according to the invention in an open position of the housing parts.
Figure 10B:
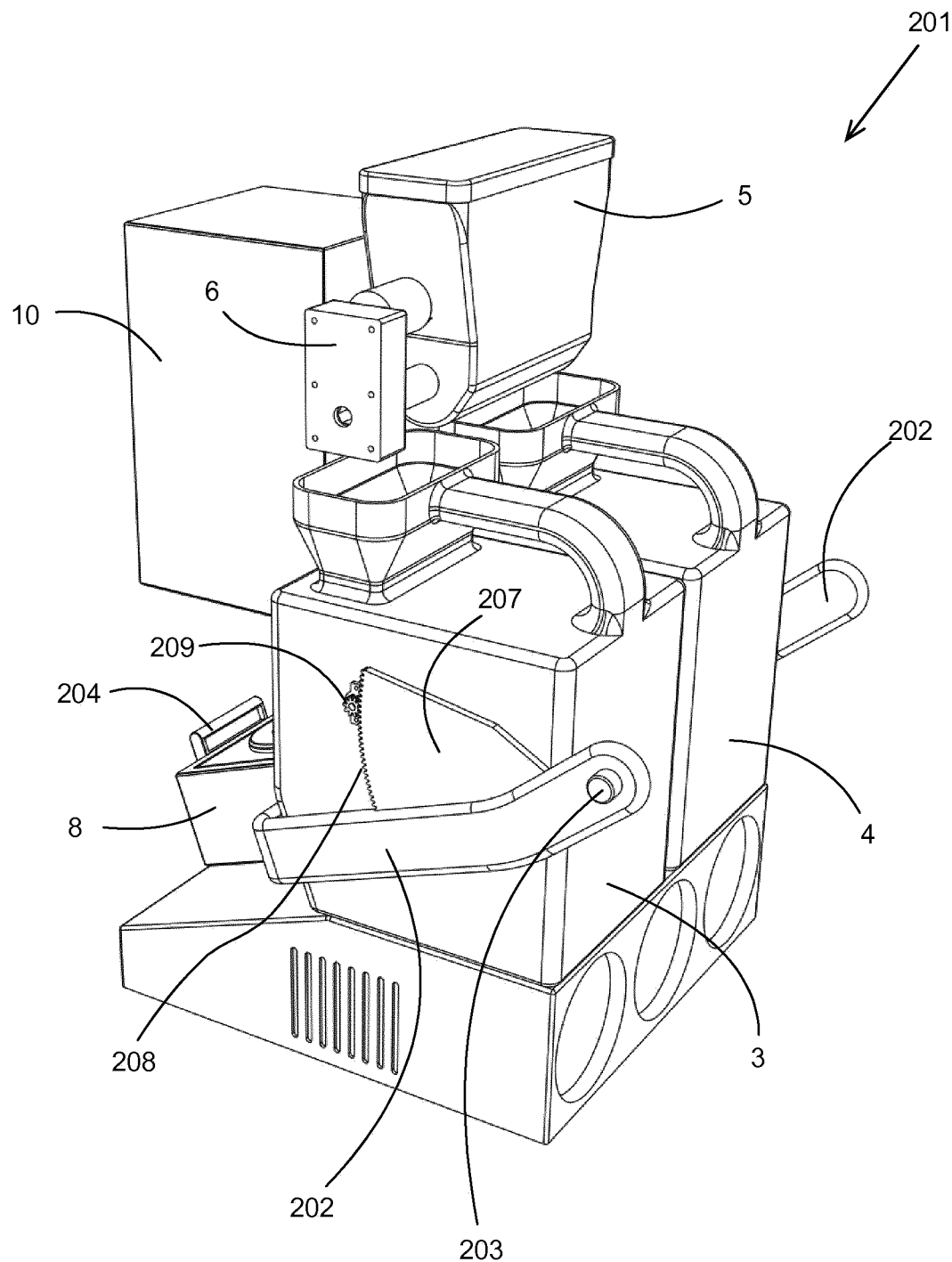
Figure 11:
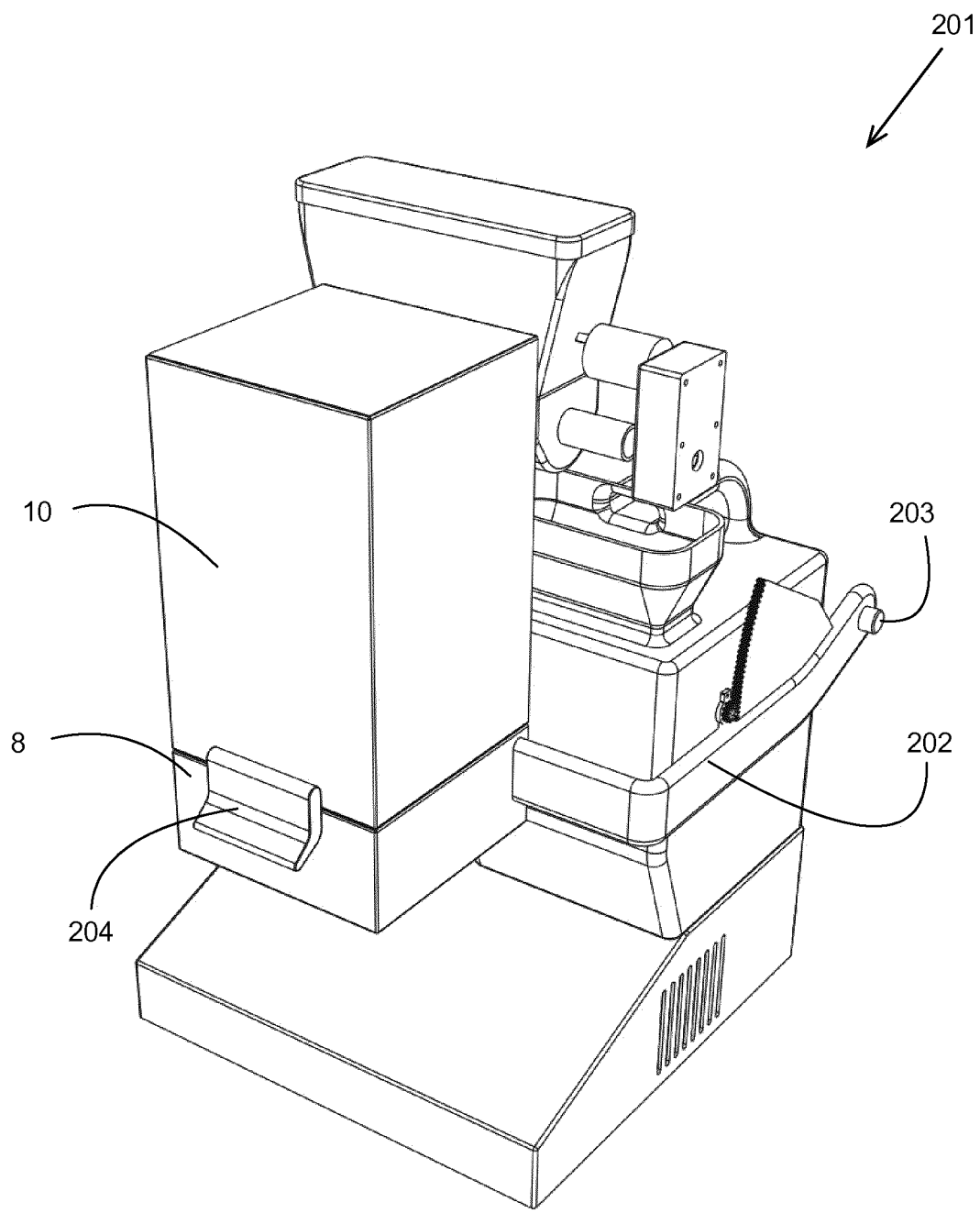
FIG. 11 shows a perspective front view and rear view of the apparatus as shown in FIGS. 10a and 10b in a closed position of the housing parts.

The FIGS. 10*a*-11 disclose a third embodiment of an apparatus 201 according to the invention which differs from the apparatus 1, 101 in that the first housing part 8 is only pivotable with respect to the second housing part 10. The first housing part 8 is provided at a side near the containers 3, 4 with two L-shaped brackets 202, which L-shaped brackets 202 are pivotable with respect to the base 2 about pivot axis 203. The pivot axis 203 has a fixed position in the apparatus 201. At a side remote of the containers 3, 4 the first housing part 8 is provided with a handle 204. By means by the handle 204 a user can manually move the first housing part 8 from the open position as shown in FIGS. 10*a*-10*b* to the closed position as shown in FIG. 11 and vice versa. In the handle 204 a locking mechanism is provided to lock the handle 204 to the second housing part 10 in the closed position of the housing parts 8, 10. Well known locking mechanisms can be used for such a lock. The base 2 of the apparatus 201 is provided with a slanted surface 205 on which the first housing part 8 rests in the open position thereof.

To provide a smooth movement of the first housing part 8 from the closed position to the open position and to prevent that the first housing part 8 simply drops on the slanted surface 205, the apparatus 201 is provided with a damping mechanism 206.

The damping mechanism 206 comprises on each L-shaped bracket 202 a disc 207 being provided with teeth 208. The teeth 208 cooperate with a gear wheel 209, which is rotatable about an axis which has fixed position in the apparatus 201. The gearwheel 209 is prevented against relatively fast rotation so that only by moving the teeth 208 relatively slowly in or opposite a direction as indicated by arrow P3 the first housing part 8 can be moved with respect to the second housing part 10.

Figure 12A:
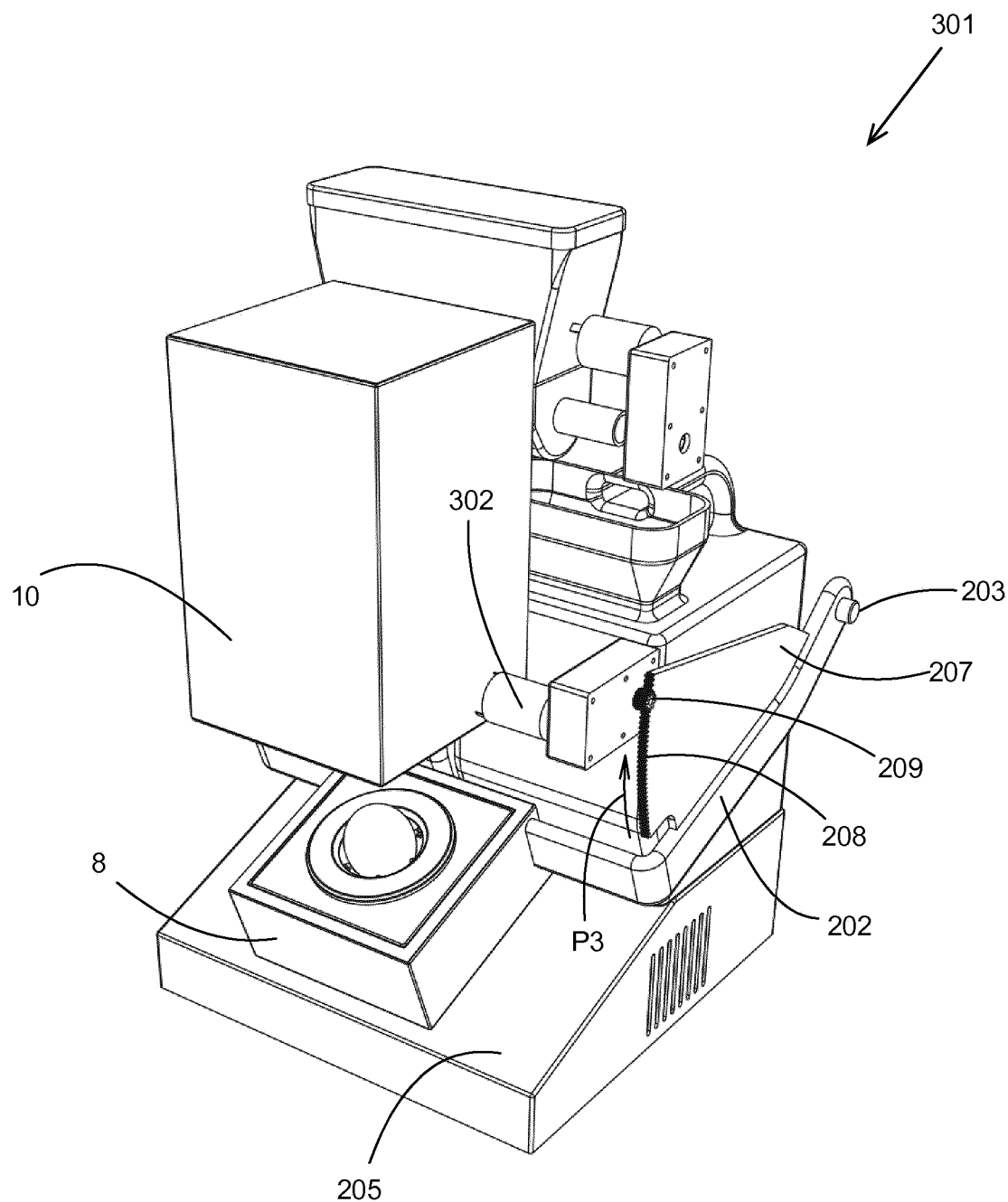
FIGS. 12a and 12b show a front and rear perspective view of a fourth embodiment of the apparatus according to the invention in an open position of the housing part.
Figure 12B:
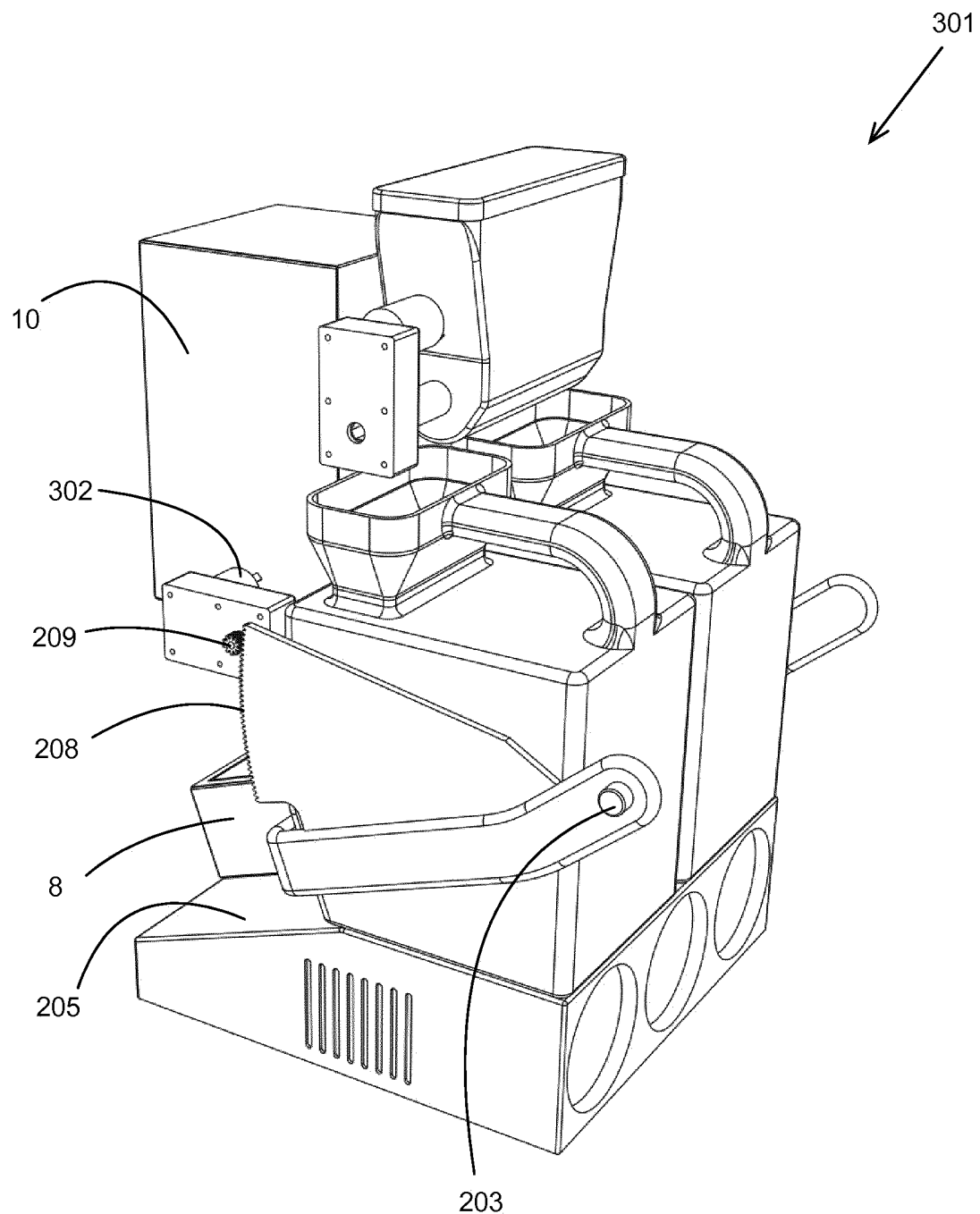
Figure 13:
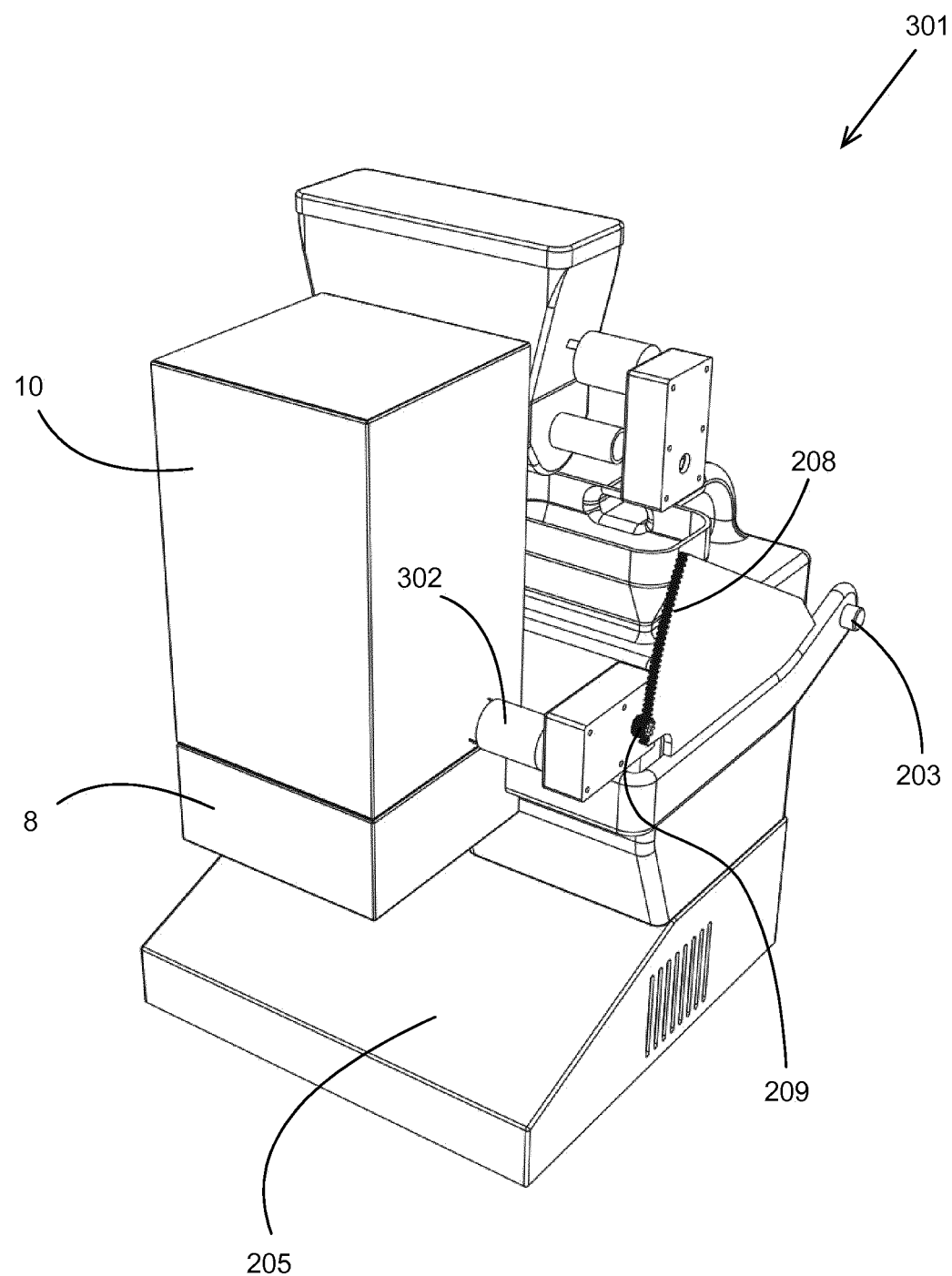
FIG. 13 shows a perspective front view and rear view of the apparatus as shown in FIGS. 12a and 12b in a closed position of the housing parts.

FIGS. 12*a*-13 disclose a fourth embodiment of an apparatus 301 according to the invention which differs from the apparatus 201 in that the gear wheel 209 is now electrically driven by a motor 302 which motor has a fixed position in the apparatus 301. By operating the electric motor 302, the gear wheel 209 is being driven. Since the gearwheel 209 cooperates with the teeth 208 on the disc 207, the disc 207 as well as the L-shaped bracket 202 and the first housing part 8 will be moved in a direction as indicated by arrow P3 to move the first housing part 8 from the open position as shown in FIGS. 12*a*-12*b* to the closed position as shown in FIG. 13. By rotating the gearwheel 209 in the opposite direction the first housing part 8 will be moved in a direction opposite to arrow P3 from the closed position to the open position.

Figure 14:
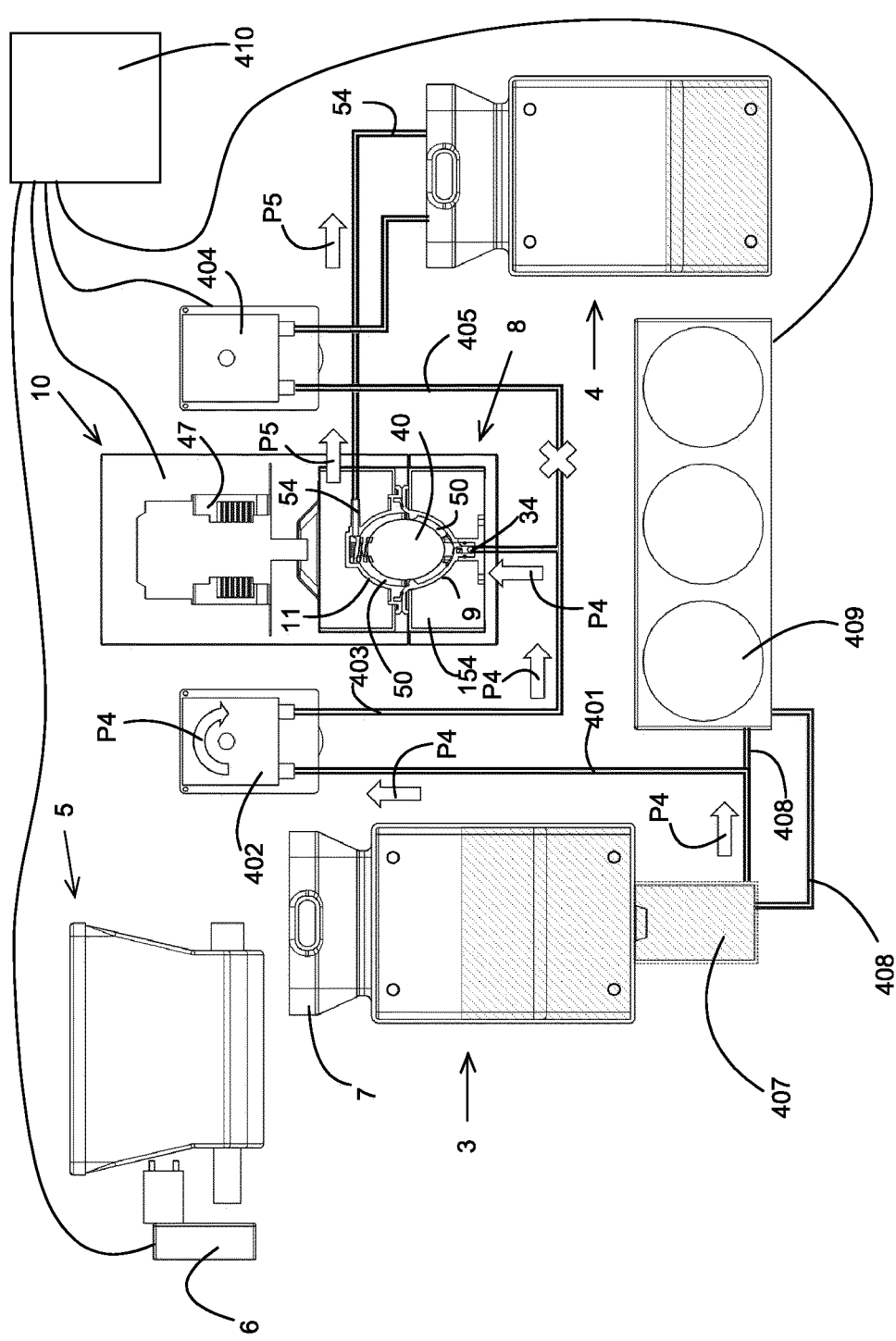
FIG. 14 shows a working scheme of the apparatus as shown in the FIGS. 6a-6b, 9, 11, 13 during the filling of the cavity and the cooking of the egg.

FIGS. 14 and 16 show a more schematic view of the apparatus 1, 101, 201, 301.

As can be seen the first container 3 is connected via a conduit 401 to a first peristaltic pump 402. An outlet of the peristaltic pump 402 is connected via a conduit 403 to the end 34 of the spirally conduit 32 in the first housing part 8. The apparatus 1, 101, 201, 301 is further provided with a second peristaltic pump 404, which is connected by means of a conduit 405 to the end 34 of the spirally conduit 32 and is connected on another side of the pump 404 by means of a conduit 406 to the container 4. The conduit 54, which is connected to the cavity 50 in the second holder part 11 opens at an end remote of the cavity 50 into the container 4. Both the containers 3, 4 are open at the top so that in the containers 3, 4 the atmospheric pressure exists.

The first container 3 is provided at its lower part with a buffer unit 407. The buffer unit 407 is connected by means of a conduit 408 to a heat exchanger, for example a Peltier heat exchanger 400 to preheat the liquid before it enters first housing part 8. In the buffer 407 a temperature sensor may be present to check whether the liquid has the desired temperature.

The peristaltic pumps 402, 404, the device 47 for providing microwave radiation in the space 154, the Peltier heat exchanger, the dosing unit 6 as well as sensors to check for example the liquid level in the containers 3, 4 are all controlled by means of a computer 410.

FIG. 14 discloses a scheme of the filling of the cavity 50 as well as the process during the cooking process of the egg 40.

The operations of the apparatus 1, 101, 201, 301 are as follows.

After placing an egg 40 in the cavity 50 and closing the first housing part 8 and the second housing part 10 the liquid in the buffer unit 407 will be heated to a predetermined temperature of for example 20 degrees Celsius.

After the liquid has reached the desired temperature the liquid will be pumped by means of the first pump 402 through the conduit 401 and the conduit 403 in the direction as shown by the arrow P4 into the spirally conduit 32 and into the cavity 50. The egg 40 will be nearly completely surrounded by the liquid except for the locations where the egg is in contact with the spacers 35 and the spring 51. It is also possible that a small part of the egg 40 near the spring 51 is not completely covered with the liquid. The liquid can be water with an addition of NaCl, for example preferably 0.2M NaCl (about 12 gram/litre water), to obtain a liquid with a dielectric constant with an imaginary part, $\varepsilon''$, between 20-500 at a temperature between 0° C.-100° C. and at a microwave frequency of 2.45 GHz.

With an egg of about 60-65 grams and a length of about 56-60 millimetres an amount of about 45 millilitre of liquid will be sufficient to fill the space between the eggshell of the egg 40 and the walls 36, 49 of the first holder part 9 and the second holder part 11, whereby a layer of liquid around the eggshell is obtained having an average thickness of 2-8 millimetres.

After the cavity 50 is initially filled with the desired amount the device 47 operating at a common 2.45 GHz is switched on at a constant power of for example 1000 Watt, whereby microwave radiation is generated in the space 54 to heat the liquid as well as the egg 40 in the cavity 50. As soon the liquid starts to boil, the generated steam can escape through the conduit 54 and will flow in the direction indicated by arrow P5 into the container 4. To prevent that due to the evaporation of the liquid the egg 40 will no longer be surrounded with liquid, additional liquid is added to the cavity 50. This liquid enters the first housing part 8 at a temperature of about 20 degrees in small pulses by activating the first pump 402 during a predetermined time. Since the conduit 32 is located inside the cavity 54, also to the liquid present in the conduit 32 will be heated by the microwave radiation. The conduit 32 might have a length of for example 40-80 centimetres being long enough to heat up the liquid in the conduit 32 at the end 34 from 20° C. so that the liquid when entering the cavity 50 will have about the same temperature as the liquid already present in the cavity 50. Other lengths are also possible.

Figure 15:
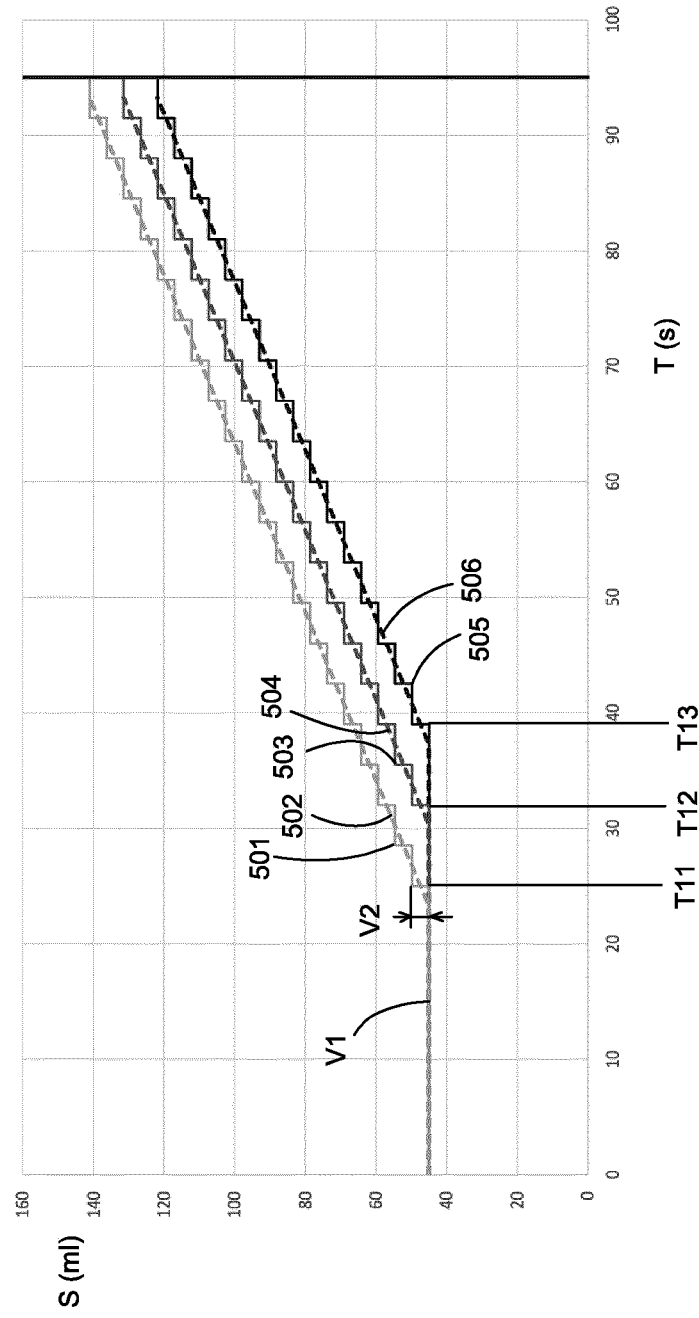
FIG. 15 shows a diagram disclosing the microwave radiation time versus the amount of liquid added to the cavity.

As can be seen in FIG. 15 a first amount V1 of liquid is added before the microwave radiation starts. After a period of time T11 of for example 25 seconds a small amount V2 of for example 5 millilitres is added to the cavity 50 which amount V2 is then added every 3.5 seconds. In the diagram, the pulses are shown by a line 501. In the diagram also the average amount of liquid added to the cavity 50 is indicated by means of a line 502. During the cooking process by means of the microwave radiation, the power of the device 47 is kept constant at 1000 Watt. By operating the device at a constant power no irregular change in the microwave radiation will occur. After 95 seconds the microwave radiation will be stopped as can be seen in the diagram. As shown in FIG. 15 almost 100 millilitres have been added to the cavity 50 after the initial first amount of 45 millilitres. By adding such a relatively large second amount of liquid starting after such a relatively short time T11, a soft-boiled egg will be obtained.

By starting the insertion of additional liquid in the cavity 50 after a longer period of time T12, for example after 32 seconds of the start of the microwave radiation and by adding the same amount V2 in the same intervals of 3.5 seconds a middle-boiled egg will be obtained. The lines 503, 504 show respectively the pulses and the average amount of added liquid. The total second amount of liquid added to the cavity 50 for a middle-boiled egg is less than for a soft-boiled egg.

If the insertion of additional liquid starts even later, for example after a longer period of time T13, for example after 39 seconds with the same amount V2 and the same interval, a hard-boiled egg will be obtained. The lines 505, 506 show respectively the pulses and the average amount of added liquid. The total second amount of liquid added to the cavity 50 for a hard-boiled egg is less than for a soft-boiled egg and a middle-boiled egg.

After the microwave radiation has been switched off, the second pump 404 is switched on to pump 405 the liquid in the cavity 50 in a direction as indicated by arrow P6 through the conduit 32 into the conduit 404, through the pump 405 into the conduit 406 into the container 4 for waste liquid. The conduit 32 as well as the tubes 33, 37 are used both as inlet for the liquid into the cavity 50 as well as an outlet of the liquid from the cavity 50.

It is also possible to use microwave radiation whereby the power thereof is changed, for example lowered during the cooking process. In such a case the amount of liquid added during the microwave radiation will be different from the amount as shown in FIG. 15. It is also possible that instead of adding the liquid in pulses with an amount of V2 to add the liquid in smaller or larger amounts with a interval being larger or smaller than described above.

It is also possible to add the liquid at a constant rate or to vary the amount of added liquid in time. Also, smaller step sizes can be chosen, such that the flow is accurately controlled by means of pulse width modulation, resulting in the same egg preparation program with the same amounts of pumped liquids.

It is also possible to have different holders for different sizes of eggs.

It is also possible to have other amounts of NaCl in the water, for example between 10 and 14 gram/litre water.

It is also possible to preheat the liquid to another temperature, for example about 30-35 degrees Celsius before entering the housing.

It is also possible to start the addition of the second amount of liquid based on for example the temperature in the cavity or the amount of liquid that has been evaporated and has left the cavity.

FIGS. 17A-19B show a dosing unit 606 for dispensing at least one component, preferably a powdery component, like salt such as NaCl. The dosing unit 606 comprises a container 605 for holding the at least one component and a housing 607 for holding the container, The container 605 for holding at least one component comprises a rectangular holder 608 provided with a bottom wall 609 and four sidewalls 610, 611 extending perpendicular to the bottom wall 609. Opposite sidewalls 610 having a length L1 being 2-4 times as large as the length L2 of the opposite side walls 611, extending perpendicular to the sidewalls 610. One of the sidewalls 11 is provided with a tubular element 612 extending perpendicular to the side all 611. The tubular element 612 is provided with a circular opening 613 and a plate 614 closing a lower part of said opening 613. The plate 614 comprises a resistance for the component to leave the opening 613, due to which a better control of the amount leaving the opening 613 is obtained.

The sidewall 611 opposite to the sidewall 611 which is provided with the opening 613, is provided with a passage 615.

In the holder 608 between the opening and the passage a rotatable feed screw 16 is located. The feed screw 616 is provided at its end 617 inside the passage 615 with longitudinal grooves 618 and raised portions 619 located between the grooves 618. The end 617 is rotatable inside the passage 615. The end 617 is prevented from moving inside the holder 608 by a flange 620. The feed screw 616 is prevented from moving out of the holder 608, for example by means of a click-mechanism.

The opening 613, the feed screw 616 and the passage 615 are located near the bottom wall 600 of the holder 608.

The container 605 comprises a cap 621 connectable to the tubular element 612 for closing the opening 613 airtight.

The holder 608 and the feed screw 616 are preferably made food approved material such as polypropylene or polystyrene.

At a top side avert of the bottom wall 600, the holder 608 is closed and sealed, after being filled with the at least one component, by means of for example an injection molded lid or a thin sheet 622 which is welded or sealed to the holder 608.

The at least one component located inside the container is powdery, like for example salt as NaCl. The container 605 holds between 500 gram and 2000 gram of NaCl.

The housing 607 to hold the container 605 comprises a holder 623 having a shape slightly larger than the holder 608 and with a groove 624 to accommodate the tubular element 612 when inserting the container 605 in the holder 623 in a direction indicated by arrow P7. Near the bottom of the holder 623, the holder 623 is provided with an opening 625 through which the tubular element 612 extend when the container 605 is located in the holder 623.

The housing 607 is provided with a cover 627 being pivotable about a pivot axis 628 in the direction indicated by the double arrow P8 from an open position as shown in FIGS. 18A-18B to a closed position as shown in FIGS. 10A-10B. The pivot axis 628 is located opposite to the groove 624.

The housing is provided with a driving unit 629 comprising a motor 630, a reduction drive 631 and a pen 632. The pen 632 is directed towards an opening 633 in the holder 623 of the housing and will be in line with the feed screw 616 when the container 605 is located inside the holder 623. The pen 632 is provided with an end 634 comprising longitudinal grooves and raised portions located between the grooves, which can be coupled with the raised portions 619 and grooves 618 of the end 617 of the feed screw 616.

Between the pivot axis 628 and the opening 633 the holder 623 is provided with an element 635 being movable in and opposite to a direction indicated by arrow P9 along a sidewall 636 of the holder 623. The element 635 is provided with a plate 637 extending parallel to the sidewall 636, a plate 638 extending perpendicular to the sidewall 636 and parallel to a top wall 639 of the holder 623, and two parallel plates 640 extending perpendicular to the sidewall 636 and perpendicular to the top wall 639 of the holder 623. At a side avert of the plate 638, the plates 640 are provided with wedge-shaped parts 641. The end 634 of the pen 632 is provided with a flange 642 extending perpendicular to the pen 632. The flange 642 is pressed against the wedge-shaped parts 641 by spring force of a spring 643. The wedge-shaped parts 641 are wider at a side near the plate 638 than at on opposite side.

On an opposite side of the pivot axis 628 a cam 644 is connected to the cover 627.

By pivoting the cover 627 in clockwise direction P8 about the pivot axis 628 from the closed position as shown in the FIGS. 19A-19B, the cover 627 will be moved to its opened position as shown in FIGS. 18A-18B. By pivoting the cover 627 in clockwise direction P8 the cam 644 will abut against the plate 638 of the element 635 and will press the element 635 downwards in the direction as indicated by arrow P9. By doing so, the wedge-shaped parts 641 will slide along the flange 642 and will move the flange 642 and the pen 632 to which it is connected in a direction indicated by arrow P10 away from the opening 633.

By pivoting the cover 627 in anti-clockwise direction P8 about the pivot axis 628, the cover 627 will be closed, the element 635 will be moved in a direction opposite to arrow P9 and the pen 632 will be moved under spring force of spring 643 in a direction opposite to arrow P10.

To insert the container 605 into the housing 607, the cover 627 needs to be in its open position, whereby the pen 632 is being retracted. After inserting the container 605 in the holder 623, the cover 627 will be closed, whereby the pen 627 will be moved towards the container 605 and the end 634 of the pen 632 will be coupled with the end 617 of the feed screw 616, whereby the raised portions 619 of one end 617, 634 will be located in the longitudinal grooves 618 of the other end 617, 634.

In FIGS. 19A-19B the pen 632 is shown in a first position wherein the pen 632 is coupled with the feed screw 616, whilst in the FIGS. 18A-18B the pen 632 is shown in a second position wherein the pen 632 is decoupled from the feed screw 616.

The dosing unit 606 comprising the housing 607 and the container 605 are used in an apparatus similar to the apparatus 1 as shown in the FIGS. 1-16. The apparatus will differ that instead of the dosing unit 6 and container 5, the dosing unit 606 comprising the housing 607 and the container 605 will be used. The opening 613 will be located above the container 4 which will be filled with fresh water whilst the container 3 is being used for waste water. The working scheme of the apparatus is shown in FIG. 20 and is similar to the working scheme as shown in FIG. 14 except that the container 4 is located on the left side and the container 3 on the right side. By rotating the feed screw 616 in the direction indicated by arrow P11, the component, like NaCl present in the container 605 will be transported towards the opening 613. For example, with each complete turn of the feed screw 616 a predetermined amount of NaCl will be pushed through the opening 613 and inserted in the container 3, 4.

In use by means of the dosing unit 606 the at least one component, for example NaCl is added to the water in the container 4 to provide the water with the desired dielectric properties, for example wherein the dielectric constant with an imaginary part, $\varepsilon''$, is between 20-500 at a temperature between 0° C.-100° C. and at a microwave frequency of 2.45 GHz. Preferably 10-14 gram/liter water, being 0.2M NaCl plus/minus 0.03M NaCl is added to the water.

Preferably the apparatus comprises means to detect the amount of the component in a container 5, 605 holding the at least one component and means to detect the amount of the component in the liquid, hold in the container 3, 4.

The means to detect the amount of the component in the container 5, 605 comprises an optical emitter and receiver positioned on opposite sides of the container 5, 605. The container 5, 605 is at least in an optical path between the emitter and the receiver transparent for light emitted by the emitter. The information obtained by the means to detect the amount of the component in the container 5, 605 is connected to the computer 410, wherein the detected amount is compared with a predetermined desired amount. If the detected amount is less than the predetermined desired amount, it may be decided by means of the computer to warn a user that he should replace the container 5, 605, that further use of the apparatus is prevented before the new container 5, 605 is being installed, etc.

The means to detect the amount of the component in the liquid may comprise means to determine the electrical conductivity of the liquid, which should be within a predetermined range. If the electrical conductivity of the liquid is below a predetermined value, it may be decided by means of the computer that a component, like NaCl should be added to the liquid.

Preferably after adding the component, like NaCl to the liquid, like water, the liquid is being stirred to obtain a good solution of the component in the liquid. The stirring can for example been done by means of a known magnetic stirrer.

The container 605 is preferably disposable and needs to be replaced with a new container after it is empty.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the scope should not be construed as limiting the scope of the claims.

LIST OF REFERENCE SIGNS 1 apparatus
2 base
3 container
4 container
5 container
6 dosing unit
7 opening
8 first housing part
9 first holder part
10 second housing part
11 second holder part
12 gearing mechanism
13 rod
14 teeth
16 gear wheel
17 pivot axis
18 gear wheel
19 teeth
20 disc
21 pivot axis
22 handle
23 leg
24 bridge shaped part
30 bottom wall
31 side wall
32 conduit
33 tube
34 end
35 spacer
36 wall
37 tube
38 sealing ring
39 opening
40 egg
41 conical part
45 top wall
46 side wall
47 device
48 chamber
49 wall
50 cavity
51 spring
52 conical part
53 seal
54 conduit
101 apparatus
154 space
201 apparatus
202 bracket
203 pivot axis
204 handle
205 surface
206 damping mechanism
207 disc
208 teeth
206 gear wheel
301 apparatus
302 motor
401 conduit
402 peristaltic pump
403 conduit
404 peristaltic pump
405 conduit
406 conduit
407 buffer
406 heat exchanger
410 computer
501 line
502 line
503 line
504 line
505 line
506 line
605 container
606 dosing unit
607 housing
608 holder
609 bottom wall
610 sidewall
611 sidewall
612 tubular element
613 opening
614 plate
615 passage
616 feed screw
617 end
618 groove
619 portion
620 flange
621 cap
622 lid
623 holder
624 groove
625 opening
627 cover
628 pivot axis
629 driving unit
630 motor
631 reduction drive
632 pen
633 opening
634 end
635 element
636 sidewall
637 plate
638 plate
639 top wall
640 plate
641 wedge-shaped part
642 flange
643 spring
644 cam
L1 length
L2 length
P3 arrow
P4 arrow
P6 arrow
P7 arrow
P8 arrow
P9 arrow
P10 arrow
V1 amount of liquid
V2 amount of liquid
T11 period of time
T12 period of time
T13 period of time

The invention claimed is:

1. An apparatus for cooking at least one egg with an eggshell, which apparatus comprises
a housing provided with a device for providing microwave radiation in a confined space in the housing and
a holder located in the confined space, which holder being provided with at least one cavity adapted to the shape of the egg with the eggshell, the at least one cavity configured to receive the egg with the eggshell, wherein a long axis of the egg with the eggshell is in a vertical orientation, which holder comprises at least a first holder part comprising spacers for keeping the egg with the eggshell at a predetermined distance from a wall of the first holder part, and a second holder part comprising an open outlet for steam formed in the at least one cavity during a cooking process, the first and second holder parts being movable with respect to each other between a first position in which the first and second holder parts are separated from one another and the egg with the eggshell can be positioned in the at least one cavity to a second position wherein the holder parts enclose the at least one cavity and the egg with the eggshell contacts the spacers of the first holder part, which apparatus further comprises means to insert a liquid into the holder for filling the at least one cavity with the liquid to at least partly surround the eggshell of the egg located in the at least one cavity, wherein the means to insert a liquid into the holder comprises at least a liquid inlet and a liquid outlet, with the liquid outlet being located in the first holder part at a point lower than the egg with the eggshell, wherein the apparatus comprises a liquid container for holding the liquid, a dosing unit to add at least one component to the liquid, and a means to detect the amount of the component in the liquid.

2. An apparatus according to claim 1, wherein in use by means of the dosing unit the at least one component is added to the liquid being aqueous to provide the aqueous liquid with a dielectric constant with an imaginary part, $\varepsilon''$, between 20-500 at a temperature between 0° C.-100° C. and at a microwave frequency of 2.45 GHz.

3. An apparatus according to claim 1, wherein the liquid is water and the at least one component is NaCl.

4. An apparatus according to claim 3, wherein the liquid is water and the at least one component is NaCl, and the NaCl is added to achieve a concentration between 0.1-0.5M NaCl.

5. An apparatus according to claim 4, wherein the liquid is water and the at least one component is NaCl, and the NaCl is added to achieve a concentration between 0.17-0.23M NaCl.

6. An apparatus according to claim 1, wherein the apparatus comprises means to detect the amount of the component in a component container holding the at least one component.

7. An apparatus according to claim 1, wherein the dosing unit for dispensing, the at least one component comprises a component container for holding the at least one component and a housing for holding the component container, which housing is provided with a driving unit, which component container is provided with a feeding device and an opening, wherein the driving unit is detachably coupled to the feeding device to feed the component from the component container through the opening.

8. An apparatus according to claim 7, wherein the feeding device is a rotatable feed screw.

9. An apparatus according to claim 7, wherein the driving unit comprising a pen, wherein the pen is movable against spring force between a first position wherein the pen is coupled with the feeding device and a second position wherein the pen is decoupled from the feeding device.

10. An apparatus according to claim 9, wherein the housing is provided with a pivotable cover being pivotable from a closed to an open position, which housing comprises means to move the pen between the first coupled position and the second decoupled position by pivoting the cover from the closed position to the open position.

11. An apparatus according to claim 7, wherein the dosing unit comprises means to detect the presence of the at least one component in the component container.

12. An apparatus according to claim 11, wherein the means to detect the presence of the at least one component in the component container comprises an optical emitter and receiver positioned on opposite sides of the component container, which component container is at least in an optical path between the emitter and the receiver transparent for light emitted by the emitter.

13. The apparatus of claim 11, wherein said means to detect the presence of the at least one component in the component container comprises an optical emitter and receiver positioned on opposite sides of the component container.

14. The apparatus according to claim 7, wherein the component container holding the at least one component is sealed.

15. The apparatus according to claim 7, wherein the at least one component located inside the component container is powdery.

16. The apparatus according to claim 7, wherein the at least one component comprises NaCl.

17. An apparatus according to claim 1, further comprising a spiral conduit configured to preheat the liquid being inserted into the holder with microwave radiation with microwave radiation from the device for providing microwave radiation in the housing.

18. A method for cooking at least one egg with an eggshell comprising:

cooking an egg in an eggshell while located in an apparatus comprising:

a housing provided with a device for providing microwave radiation in a confined space in the housing and a holder located in the confined space, which holder being provided with at least one cavity adapted to the shape of the egg with the eggshell, the at least one cavity configured to receive the egg with the eggshell, wherein a long axis of the egg with the eggshell is in a vertical orientation, which holder comprises at least a first holder part comprising spacers for keeping the egg with the eggshell at a predetermined distance from a wall of the first holder part, and a second holder part comprising an open outlet for steam formed in the at least one cavity during a cooking process, the first and second holder parts being movable with respect to each other between a first position in which the first and second holder parts are separated from one another and the egg with the eggshell can be positioned in the at least one cavity to a second position wherein the holder parts enclose the at least one cavity and the egg with the eggshell contacts the spacers of the first holder part, which apparatus further comprises means to insert a liquid into the holder for filling the at least one cavity with the liquid to at least partly surround the eggshell of the egg located in the at least one cavity, wherein the means to insert a liquid into the holder comprises at least a liquid inlet and a liquid outlet located, with the liquid outlet being located in the first holder part at a point lower than the egg with the eggshell, wherein the apparatus comprises a liquid container for holding the liquid and a dosing unit, wherein by means of the dosing unit at least one component is added to the liquid.

19. A method according to claim 18, wherein the apparatus further comprises a spirally conduit configured to preheat the liquid being inserted into the holder with microwave radiation from the device for providing microwave radiation in the housing.

20. A method according to claim 18, further comprising:
opening the holder by separating the first holder part from the second holder part;
removing a cooked egg with an eggshell of the cooked egg from the holder;
placing the at least one egg with the eggshell into the at least one cavity;
sealing the first holder part against the second holder part; and
cooking the egg with the eggshell.

* * * * *